US008413090B1

(12) United States Patent
Kuehlmann et al.

(10) Patent No.: US 8,413,090 B1
(45) Date of Patent: *Apr. 2, 2013

(54) TEMPORAL DECOMPOSITION FOR DESIGN AND VERIFICATION

(75) Inventors: Andreas Kuehlmann, Berkeley, CA (US); Xiaoqun Du, New Providence, NJ (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/020,476

(22) Filed: Feb. 3, 2011

Related U.S. Application Data

(62) Division of application No. 12/345,473, filed on Dec. 29, 2008, now Pat. No. 7,900,173, which is a division of application No. 11/144,389, filed on Jun. 2, 2005, now Pat. No. 7,596,770.

(51) Int. Cl.
*G06F 17/50* (2006.01)
(52) U.S. Cl. ......... 716/107; 716/106; 716/111; 716/132
(58) Field of Classification Search .................. 716/106, 716/107, 111, 132
See application file for complete search history.

(56) References Cited

U.S. PATENT DOCUMENTS

| | | | | |
|---|---|---|---|---|
| 5,680,332 | A * | 10/1997 | Raimi et al. | 703/13 |
| 6,182,268 | B1 * | 1/2001 | McElvain | 716/104 |
| 6,389,586 | B1 * | 5/2002 | McElvain | 716/111 |
| 7,596,770 | B1 * | 9/2009 | Kuehlmann et al. | 716/106 |
| 7,900,173 | B1 * | 3/2011 | Kuehlmann et al. | 716/107 |
| 2004/0078674 | A1 * | 4/2004 | Raimi et al. | 714/33 |

OTHER PUBLICATIONS

Fummi et al., "Synthesis for Testability of Highly Complex Controllers by Functional Redundancy Removal", Dec. 1999, IEEE Transactions on Computers, vol. 48, iss. 12, pp. 1305-1323.*
Singh et al et al., "Synthesis for Logical Initializability of Synchronous Finite-State Machines", Oct. 2000, IEEE Transactions on Very Large Scale Integration (VLSI) systems, vol. 8, iss.5, pp. 542-557.*
"U.S. Appl. No. 12/345,473 Non Final Office Action mailed Jul. 8, 2010", 7 pgs.
"U.S. Appl. No. 12/345,473 Notice of Allowance mailed Oct. 22, 2010", 6 pgs.
"U.S. Appl. No. 12/345,473, Response filed Oct. 8, 2010 to Non Final Office Action mailed Jul. 8, 2010", 11 pgs.
"U.S. Appl. No. 13/020,491, Non Final Office Action mailed Jun. 14, 2012".
Baumgartner, J, et al., "Property checking via structural analysis", Computer-Aided Verification (CAV '02), (Copenhagen, Denmark), (Jan. 1003), 151-165.

(Continued)

*Primary Examiner* — Sun Lin
(74) *Attorney, Agent, or Firm* — Schwegman Lundberg & Woessner, P.A.

(57) ABSTRACT

Behavior of a finite state machine is represented by unfolding a transition relation that represents combinational logic behavior of the finite state machine into a sequence of transition relations representing combinational logic behavior of the finite state machine in a sequence of time frames. At least one state is determined in a transition relation in the sequence that cannot be reached in a subsequent transition relation in the sequence. A subsequent transition relation in the sequence in which the at least one state cannot be reached is simplified with respect to the at least one unreachable state.

16 Claims, 11 Drawing Sheets

OTHER PUBLICATIONS

Beerel, et al., "Covering Conditions and Algorithms for the Synthesis of Speed-Independent Circuits", IEEE Transactions on CAD, (Mar. 1998), 1-17.

Bekki, et al., "An Automatic Finite State Machine Synthesis Using Temporal Logic Decomposition", IEEE International Conference on Computer-Aided Design, Digest of Technical Papers, (Nov. 1991), 422-425.

Biere, A, et al., "Bounded Model Checking", Advances in Computers, vol. 58, by Elsevier Sciences (USA), (2003), 117-148.

Biere, A, et al., "Symbolic model checking without BDDs", 5th International Conference on Tools and Algorithms for Construction and Analysis of Systems (TACAS '99) (Amsterdam, Netherlands), (Mar. 1999), 193-207.

Bjesse, P, et al., "SAT-based Verification without State Space Taversal", formal Methods in Computer-Aided Design (FMCAD '00) (Austin, TX) Springer-Verlag, (Nov. 2000), 372-389.

Chauhan, P, et al., "Automated abstraction refinement for model checking large state spaces using SAT based conflict analysis", Formal Methods of Computer Aided Design (FMCAD '02) Springer-Verlag, (Nov. 2002), 33-51.

Ganai, Malay, et al., "Improved SAT-based Bounded Reachability Analysis", Proceedings of the 7th ASPDAC 15th International Conference on VLSI Design, (Jan. 2002), 729-734.

Gupta, Aarti, et al., "Dynamic Detection and Removal of Inactive Clauses in SAT with Application in Image Computation", 38th Design Automation Conference Proceedings (Las Vegas, NV), (2001).

Kroening, D, et al., "Efficient computation of recurrence diameters", International Conference for Verification, Model Checking, and Abstract Interpretation, (Jan. 2003).

Kuehlman, Andreas, et al., "Equivalence Checking Using Cuts and Heaps", 34th Design and Automation Conference Proceedings, (1997), 263-268.

Kuehlmann, Andreas, et al., "Robust Boolean Reasoning for Equivalence Checking and Functional Property Verification", IEEE Transactions on Computers Aided Design, vol. 21 No. 12, (Dec. 2002), 1377-1394.

McMillan, Kenneth L., et al., "Automatic abstraction without conterexamples", International Conference on Tools and Algorithms for Constructiona and Analysis of Systems (TACAS '03), (Warsaw, Poland) LNCS 2619, (Apr. 2003), 2-17.

Sheeran, M, et al., "Checking safety properties using induction and a SAT-solver", Formal Methods in Computer-Aided Design (Austin, TX), Springer-Verlag, (Nov. 2000), 108-125.

Shtrichman, O, "Pruning techniques for the SAT-based Bounded Model Checking Problem", Correct Hardware Design and Verification Methods (CHARME' '01) (Livingston, Scotland) Sptnger-Verlang, (Sep. 2001), 58-70.

Zhang, Liang, et al., "Incremental Deductive & Inductive Reasoning for SAT based Bounded Model Checking", Proceedings of IEEE/ACM International Conference on Computer Aided Design, (Nov. 2004), 502-509.

* cited by examiner

| Design | # State Variables | CEX Length | CNF-based BMC (sec) | AIG+Simpl BMC (sec) |
|---|---|---|---|---|
| d1 | 1115 | 7 | 133 | 3.2 |
| d2 | 165 | 12 | 72 | 2.9 |
| d3 | 121 | 4 | 8.03 | 0.7 |
| d4 | 68 | 8 | 2.4 | 0.03 |
| d5 | 144 | 21 | 131 | 5.8 |
| d6 | 130 | 20 | 47.5 | 8.2 |
| d7 | 82 | 17 | 16.3 | 0.6 |
| d8 | 126 | 17 | 27.4 | 1.4 |
| d9 | 177 | 6 | 38.9 | 0.1 |
| d10 | 117 | 22 | 80.5 | 0.9 |
| d11 | 471 | 17 | 80.5 | 6.06 |
| d12 | 80 | 13 | 46.2 | 9.2 |
| d13 | 277 | 15 | 7312 | 169 |
| d14 | 83 | 72 | 3080 | 467 |
| d15 | 378 | 54 | 440 | 136 |
| d16 | 647 | 41 | 6594 | 203 |
| d17 | 243 | 42 | 46 | 0.1 |
| d18 | 77 | 310 | 2881 | 12.1 |
| d19 | 221 | 55 | 4699 | 51 |
| d20 | 155 | 1152 | 63441 | 58 |
| d21 | 192 | 34 | 52.1 | 1.01 |

FIG. 12

TEMPORAL DECOMPOSITION FOR DESIGN AND VERIFICATION

CROSS-REFERENCE TO RELATED APPLICATION

This application is a divisional of application Ser. No. 12/345,473 filed on Dec. 29, 2008 and claims the benefit of priority under 35 U.S.C. §120 to U.S. Pat. No. 7,900,173, entitled "TEMPORAL DECOMPOSITION FOR DESIGN AND VERIFICATION," which issued Mar. 1, 2011, which is a divisional of application Ser. No. 11/144,389 filed on Jun. 2, 2005 and claims the benefit of priority under 35 U.S.C. §120 to U.S. Patent No. 7,596,770, entitled "TEMPORAL DECOMPOSITION FOR DESIGN AND VERIFICATION," which issued Sep. 29, 2009, which are hereby incorporated by reference herein in their entirety.

BACKGROUND OF THE INVENTION

1. Field of the Invention

The invention relates in general to designing integrated circuits, and more particularly, to designing integrated circuit finite state machines.

2. Description of the Related Art

The past decade has seen tremendous growth in the complexity of integrated circuit (IC) designs. Functional verification of IC designs is rapidly becoming one of the most crucial and resource-intensive components of the product design cycle. Conventionally, designs have been verified using extensive simulation. However, simulation-based validation often is insufficient to provide the requisite design coverage needed to expose subtle bugs in increasingly large and complex designs. For many IC designs, only a small fraction of the design's state space can be covered reasonably by simulation. Although formal verification techniques based on binary decision diagrams (BDDs) offer the potential of exhaustive coverage and have met with some success, in practice, the application of BDDs has been limited by the state explosion problem. See, M. Ganai and A. Aziz, "Improved SAT-based Bounded Reachability Analysis," *Proceedings of the 7th ASPDAC/15th International Conference on VLSI Design*, pp. 729-734, January 2002; and L. Zhang, M. Prasad and M. Hsiao, "Incremental Deductive & Inductive Reasoning for SAT-based Bounded Model Checking," *Proceedings of IEEE/ACM International Conference on Computer Aided Design*, pp. 502-509, November 2004.

Model checking is a verification technique that has been developed to complement simulation-based verification. One of the central problems in synthesis and verification of sequential circuits is reachability analysis. For example, properties to be checked by an automatic verification tool are required to hold in those states that the system can assume after starting in a designated start sate. Reachability analysis is the task of finding this set. Sequential circuits can be modeled as finite state machines (FSM). Reachability analysis typically relies on a traversal of a state transition graph of a FSM. See, K. L. McMillan, *Symbolic Model Checking*, Kluwer Academic Publishers 1993.

During model checking, an IC design to be verified is modeled as a finite state machine, and a design specification is formalized by writing temporal logic properties. The reachable states of the design are then traversed in order to verify the properties. In case the property fails, a counterexample is generated in the form of a sequence of states leading up to the failure. In general, properties may be classified as 'safety' or 'liveness' properties. While the former declares what should not happen (or equivalently, what should always happen), the latter declares what should eventually happen. A counterexample to safety properties is a trace of states, where the last state contradicts the property. A counterexample to liveness properties, in its simplest form, is a path to a loop that does not contain the desired state. Such a loop represents an infinite path that never reaches the specified state.

Ordinarily, even the most advanced model checkers are unable to verify all desired properties of a system design in a reasonable amount of time, due to the immense state-spaces of such systems. Model checking can be viewed as finding logical errors ('falsification') rather than for proving that they do not exist ('verification'). Thus, model checking tools typically are used as complementary to the more traditional verification methods involving testing and simulation, and not as an alternative. Often, model checking tools are capable of finding errors that are not likely to be found by simulation. One reason for this is that unlike simulators, which ordinarily examine only a relatively small set of test cases, model checkers may consider virtually all possible behaviors or executions of a system design. Also, the process of writing the temporal properties in a formal language can be quite beneficial by itself, as it clarifies potential ambiguities in an IC design specification. See, A. Biere, A. Cimatti, E. M. Clarke, O. Strichman, Y. Zhu, et al., "Bounded Model Checking," *Advances in Computers*, Vol. 58, pp. 117-148, by Elsevier Sciences (USA), 2003.

The basic idea in Bounded Model Checking (BMC) is to search for a counterexample in the executions whose length is bounded by some integer k. Given a temporal logic property p to be verified for a design modeled as a FSM, the basic idea is to search for counterexamples to p in the space of all executions of the FSM whose length is bounded by some integer k. This problem is translated into a Boolean formula which is satisfied if and only if a counterexample exists for the given value of k. If no counterexample is found then one increases k until either a counterexample is found, the problem becomes intractable, or some pre-known upper bound is reached. It will be appreciated that correctness of a design, modeled as a FSM, is verified only within a finite number of clock cycles, also known as a 'bound'.

The check for counterexamples is performed by a satisfiability (SAT) solver. In BMC, the search for counterexamples of increasing length is translated into a sequence of SAT checks. Modern SAT solvers can handle propositional satisfiability problems with hundreds of thousands of variables or more. Significant improvements in SAT solvers have shown that SAT-based BMC often can reason about systems well beyond the capacity limit of BDD-based methods See, A. Biere, et al; and L. Zhang et al.

More specifically, a BMC is an incomplete property checking method that is based on a finite unfolding of a transition relation representing a FSM to disprove the correctness of a set of properties or to prove them for a limited execution lengths from the initial states. FIG. 1 is an illustrative drawing of a sequential circuit implementing a FSM. The FSM has a set of primary inputs x, a set of present state variables s, which are fed by a register, a set of next state variables s', providing input to the register, and a set of primary outputs y. The FSM implements a combinational logic function in order to produce a set of primary outputs y, and next state values for s' from a set of primary inputs x for a given set of present state variables s.

A FSM can be expanded into a set of time frames to produce a structural representation of a sequence of FSM states. FIG. 2 is an illustrative drawing showing a temporal expansion of the FSM of FIG. 1 into three time frames. Each time frame replicates the combinational logic of the FSM for each clock cycle being considered. Each time frame includes a copy of the combinational logic implementing a combinational transition function and a corresponding output of the FSM. The circuit structure obtained by this time-frame expansion is a purely combinational structure called transition relation or an iterative logic array (ILA). A transition relation contains no storage elements. Instead, for each frame of an ILA the state variable output values of the transition relation are passed along as inputs to the next frame of the ILA.

BMC techniques repeatedly concatenate a transition relation to unfold an FSM with increasing depths. In the illustrative example of FIG. 2, an initial state $s_0$ is injected at the present state variable $s_0$ of the first time frame. This illustrated sequence of transition relations constitutes a combinational network, which calculates for a given input sequence $(x_0, x_1, x_2)$ the output sequence and next-state response, $s_3$, of the FSM. By applying all input sequences of length three (3) to this circuit, we obtain, at the state variables $s_3$, all possible states the machine can assume at t-3. A temporal expansion of an FSM into t time frames is an implicit representation of the set of states the FSM can assume after exactly t clock ticks. See, D. Stoffel, et al.

BMC has gained significant acceptance in property verification due to its relative robustness in practical applications. Although exhaustive up to the applied bound, BMC does not guarantee completeness, i.e., proving the correctness of a property for depths 0 through k does not necessarily imply that no violation will occur at depths greater than k. Nevertheless, for practical applications BMC has a significant value for refuting properties.

There is a rich set of publications addressing improvements of the original BMC technique. Multiple approaches aim at ensuring completeness, including diameter-based methods, e.g., A. Biere, A. Cimatti, E. M. Clarke and Y. Zhu, "Symbolic model checking without BDDs," in *5th International Conference on Tools and Algorithms for Construction and Analysis of Systems* (*TACAS '99*) (Amsterdam, Netherlands) pp. 193-207, March 1999; J. Baumgartner, A. Kuehlmann and J. Abraham, "Property checking via structural analysis," in *Computer-Aided Verification* (*CAV '02*), (Copenhagen, Denmark), pp. 151-165, January 2003; and D. Koening and O. Strichman, "Efficient computation of recurrence diameters," in *International Conference for Verification, Model Checking, and Abstract Interpretation*, January 2003, abstraction-based techniques that combine BMC with classical symbolic model checking, e.g., P. Chauhan, E. Clarke, J. Kukula, S. Sapra and D. Wang, "Automated abstraction refinement for model checking large state spaces using SAT based conflict analysis." in *Formal Methods of Computer Aided Design* (*FMCAD '02*), pp. 33-51, Springer-Verlag, November 2002; and K. L. McMillan and N. Amla, "Automated abstraction without counterexamples,", in *International Conference on tools and Algorithms for Construction and Analysis of Systems* (*TACAS '03*), (Warsaw, Poland), pp. 2-17, April 2003 LNCS 2619, and inductive methods that can prove correctness of k-step inductive properties as part of the BMC unfolding e.g., M. Sheeran, S. Singh and G. Stalmarck, "Checking safety properties using induction and a SAT-solver," in *Formal Methods in Computer-Aided Design* (Austin, Tex.), pp. 108-125, Springer-Verlag, November 2000. Other works improve the SAT engine itself and address efficient encoding schemes e.g., A. Gupta, Z. Yang and P. Ashar, "Dynamic Detection and removal of inactive clauses in SAT-solver," in 38*th Design Automation Conference Proceedings* (Las Vegas, Nev.), 2001.

AND/INVERTER graphs (AIGs) were previously proposed for use in design verification in A. Kuehlmann and F. Krohm, "Equivalence Checking Using Cuts and Heaps," in *Proceedings of the 34th ACM/IEEE Design Automation Conference*, (Anaheim, Calif.), pp. 263-268, June 1997; and A. Kuehlmann, V. Paruthi, F. Krohm and M. K. Ganai, "Robust Boolean Reasoning for Equivalence Checking and Functional Property Verification," *IEEE Transactions on Computer-Aided Design*, vol. 21, pp. 1377-1394, December 2002. In M. Ganai and A. Aziz, "Improved SAT-based Bounded Reachability Analysis," *Proceedings of the 7th ASPDAC/15International Conference on VLSI Design*, pp. 729-734, January 2002, AIGs also were applied for BMC with the specific improvement to assert previously proved properties at past time frames in the BMC unfolding. Also, see M. Sheeran, S. Singh and G. Stalmarck, "Checking safety properties using induction and a SAT-solver," in *Formal Methods in Computer-Aided Design* (Austin, Tex.), pp. 108-125, Springer-Verlag, November 2000. This prior work and others (e.g. See, A. Kuehlmann, V. Paruthi, F. Krohm and M. K. Ganai, "Robust Boolean Reasoning for Equivalence Checking and Functional Property Verification," *IEEE Transactions on Computer-Aided Design*, vol. 21, pp. 1377-1394, December 2002; and P. Bjesse and K. Claessen, "SAT-based verification without state space traversal," in *Formal Methods in Computer-Aided Design* (*FMCAD '00*), (Austin, Tex.), pp. 372-389, Springer-Verlag, November 2000) apply simplification for a BMC unfolding.

Moreover, a BMC unfolding may include transition relations that have unreachable states. An unreachable state is a state that becomes unreachable after some number of transitions of a finite state machine. FIG. 3A is an illustrative drawing of a state transition diagram for a finite state machine (not shown) that includes states S1-S5 in which state S1 becomes unreachable after one state transition. In other words, no matter what state the finite state machine starts out from, state S1 will be unreachable after the first state transition. FIG. 3B is an illustrative drawing of a state transition diagram of a different finite state machine (not shown) including states R1-R5 in which state R1 becomes unreachable after one state transition, and state R2 becomes unreachable after two state transitions. No matter what state the finite state machine starts out from, state R1 will be unreachable after the first state transition, and R2 will be unreachable after the second state transition. BMC for unreachable states is unnecessary and wasteful of computing resources. Thus, there has been a need to identify and eliminate the checking of unreachable states from a BMC unfolding.

Unfortunately, due to the initialization, the time frames of a BMC unfolding are unique and their simplification cannot be reused for later frames. As a result, a significant amount of redundant work was performed repeatedly during each BMC step, e.g. to discover that two AND vertices are invariantly equivalent after a few transitions. Moreover, proving the same equivalence in subsequent BMC unfolding frames typically requires a growing reasoning effort due to the enlarging formula depth.

One earlier method of simplification of BMC unfolding frames reuses clauses of a formula in Conjunctive Normal Form (CNF) which are learned during earlier BMC steps for future unfoldings. See, O. Shtrichman, "Pruning techniques for the SAT-based bounded model checking problem," in *Correct Hardware Design and Verification Methods* (*CHARME '01*), (Livingston, Scotland), pp. 58-70, Springer-Verlag, September 2001. However, the proposed reuse method is restricted to a CNF-based representation and basically copies learned clauses from previous frames.

There also has been a need for improvements in finite state machines with states that become unreachable after some number of time frames. In such machines, certain logic that relates to states that become unreachable after the initial time frames is not necessary after the states become unreachable. The presence of such unnecessary logic in later time frames can reduce the potential of speed and efficiency of the machine in later time frames when unreachable states have become unreachable.

Thus, there has been a need for improvements in BMC. There also has been a need for improvements in finite state machines to reduce inefficiencies associated with unreachable states. The present invention meets these needs.

SUMMARY OF THE INVENTION

In one aspect, behavior of a finite state machine is represented by unfolding a transition relation that represents combinational logic behavior of the finite state machine into a sequence of transition relations representing combinational logic behavior of the finite state machine in a sequence of time frames. At least one state is determined in a transition relation in the sequence that cannot be reached in a subsequent transition relation in the sequence. A subsequent transition relation in the sequence in which the at least one state cannot be reached is simplified with respect to the at least one unreachable state.

These and other features and advantages of the invention will become apparent from the following description of embodiments thereof in conjunction with the appended drawings.

BRIEF DESCRIPTION OF THE DRAWINGS

FIG. 12 provides a table showing runtime results comparing prior CNF-based BMC with a tuned BMC implementation based on AIG reasoning, SAT sweeping, dynamic simplification, and simplification through induction in accordance with an embodiment of the invention.

DETAILED DESCRIPTION OF THE PREFERRED EMBODIMENTS

Figure 1:
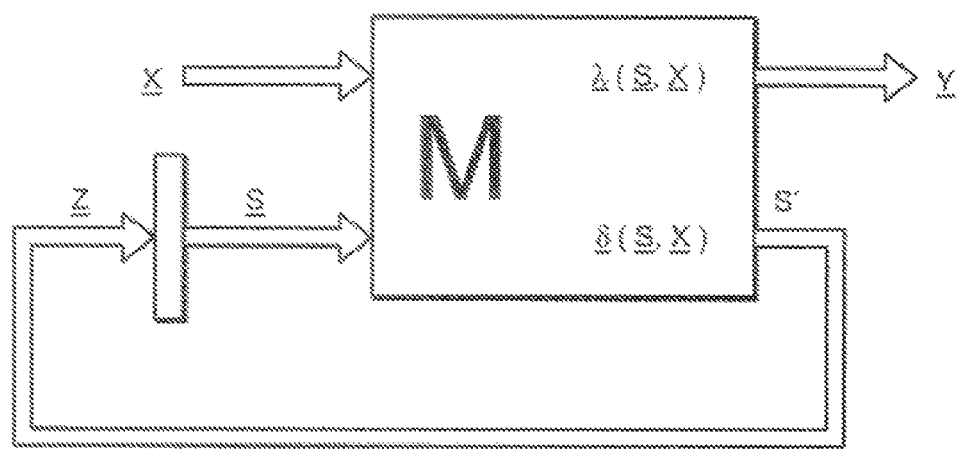
FIG. 1 is an illustrative drawing of an example sequential circuit implementing a FSM that can be modeled as a transition relation during BMC.
Figure 2:
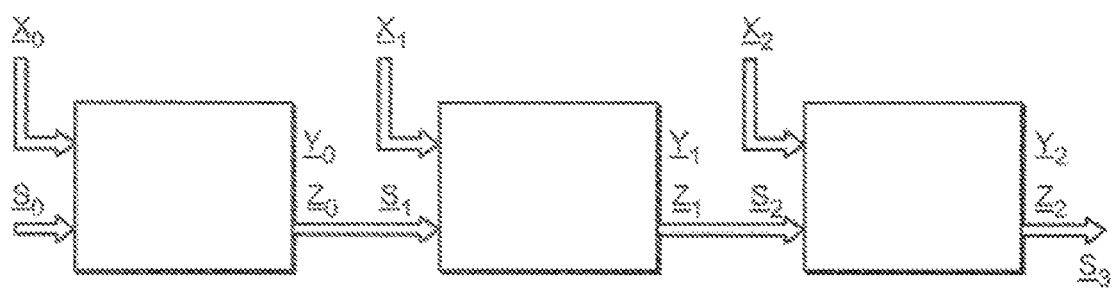
FIG. 2 is an illustrative drawing showing a temporal expansion of the FSM of FIG. 1 into three transition relations during a BMC unfolding.
Figure 3A:
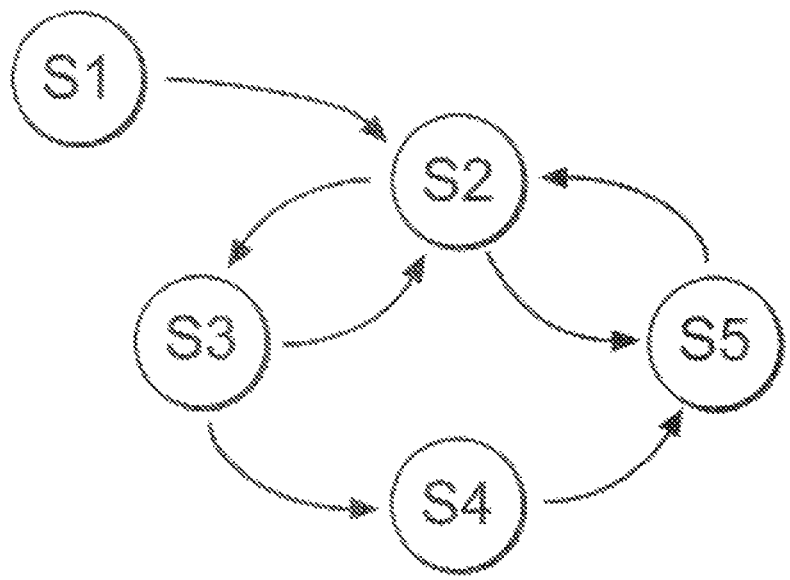
FIGS. 3A-3B are illustrative drawings of state transition diagrams for two finite state machines that includes states that become unreachable after some number of state transitions.
Figure 3B:
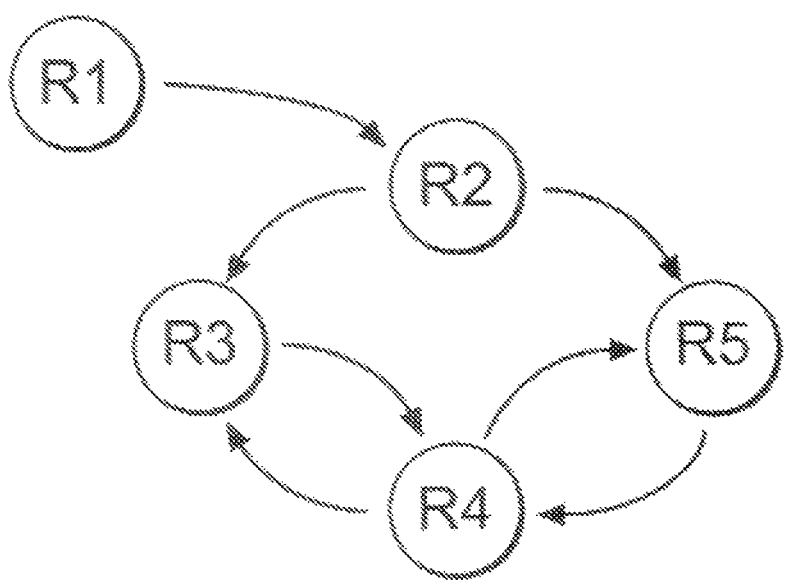

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Overview

An improved approach to BMC applies dynamic simplification of the transition relation using a dual unfolding process. Applying previous time frames as constraints, a transition relation is progressively compacted as the BMC unfolding depth increases. This results in an asymptotic compaction of the transition relation, making the BMC checks of future time frames more efficient. In the first part of this disclosure a general description of this technique is described for one embodiment of the invention, which is independent of the underlying data structures and reasoning mechanisms. This is followed by a description of a specific implementation using an AND/INVERTER graph (AIG) representation which is particularly suited for the dynamic simplification method.

A SAT sweeping simplification procedure is described that is explicitly tuned for AIGs. SAT sweeping compacts the graph by identifying functional equivalent vertices using a combination of simulation, SAT queries, and structural hashing. In one embodiment of the invention, SAT sweeping is employed to simplify both a BMC-unfolding and a separate uninitialized transition relation unfolding. Basically, SAT sweeping involves structural hashing and SAT queries to permit re-use of the same vertex in an AIG to represent two different AND gates if both AND gates have the same inputs. The particular advantage of SAT sweeping is its robustness for deep AIGs which are typical for applications in bounded model checking. Furthermore, this technique can handle arbitrary input constraints which makes it generally applicable for the simplification technique described above. The application of dynamic simplification with SAT sweeping can also identify functional equivalences across time frames. This can be applied for inductive reasoning, making BMC complete for special cases.

Experimental results indicate that a BMC implementation based on AIGs and dynamic simplification can speed up verification runs by several orders of magnitude when compared with a state-of-the-art CNF-based BMC implementation.

Preliminary Discussion of BMC in General

This section briefly summarizes some basic BMC concepts using the notation of, M. Sheeran, S. Singh, and G. Stålmark, "Checking safety properties using induction and a SAT-solver," in *Formal Methods in Computer-Aided Design*, (Austin, Tex.), pp. 108-125, Springer-Verlag, November 2000. Let s denote the set of state variables and T(s,s') be the predicate for the transition relation from the current state s to the next state s'. Furthermore, let I(s) denote the set of initial states and P(s) be the safety property to be checked, i.e., we attempt to verify the safety formula AGP (informally, "P is globally true along all paths"). Bounded model checking is based on an explicit unfolding of the transition relation; we will use the notation $s_i$ to refer to the copy of the state variables for time frame i. Then $$T^k(s_0, s_k) = \bigwedge_{0 \leq i < k} T(s_i, s_{i+1}) \qquad (1)$$

with $T^0=1$, denotes the predicate for all paths of length k from state $s_0$ to state $s_k$. Checking whether P can be violated in state $s_k$, reached from the initial state in exactly k steps, can be accomplished by a SAT check of the following formula:

$$BMC_k = I(s_0) \wedge T^k(s_0, s_k) \wedge \neg P(s_k) \qquad (2)$$

BMC iteratively searches for violations of P by successively checking formula (2) for k=0 up to a given bound n.

For the predicate for a property P(s), ¬ P(s)=1 indicates that s violates the property.

Note, that if the checks for 0 ... k−1 have passed in previous BMC iterations, one can safely modify the path predicate T as follows:

$$TP^k(s_0, s_k) = \bigwedge_{0 \leq i < k} P(s_i) \wedge T(s_i, s_{i+1}) \qquad (3)$$

with $TP^0=1$, leading to a modified check at step k:

$$BMC_k = I(s_0) \wedge TP^k(s_0, s_k) \wedge \neg P(s_k) \qquad (4)$$

By additionally checking the formula:

$$INV_k = TP^k(s_0, s_k) E \neg P(s_{k+1}) \qquad (5)$$

at unfolding depth k, one can detect whether P is a k-step inductive invariant. In other words, if the sequence of checks of $BMC_k$ for k=0...n yields unsatisfiability, and the check for $INV_k$ for k=n also yields unsatisfiability, then correctness of P is proved by induction. This is because the unsatisfiability of $BMC_k$ for k=0...n ensures that the property is satisfied on the first n states starting from the initial state; and the unsatisfiability of $INV_k$ ensures that for any path of length n, if all states on the path satisfies the property, then in the (n+1)th state the property is also satisfied. Thus by induction, the property is always satisfied from any states reachable from the initial state.

For completeness, note that conditions (4) and (5) can be further tightened by excluding non-simple paths from consideration, i.e., paths that are restricted to visiting each state at most once. The corresponding simple path condition is:

$$TP^k_{simple}(s_0, s_k) = \bigwedge_{0 \leq i < k} TP(s_i, s_{i+1}) \wedge \bigwedge_{0 \leq i < j \leq k} s_i \neq s_j \qquad (6)$$

and would replace $TP^k$ in (4) and (5). Additional conditions for further tightening the paths are outlined in, M. Sheeran, S. Singh, and G. Stålmark, "Checking safety properties using induction and a SAT-solver," in *Formal Methods in Computer-Aided Design*, (Austin, Tex.), pp. 108-125, Springer-Verlag, November 2000.

Preliminary Discussion of Satisfiability (SAT) Algorithms in General

An instance of the satisfiability (SAT) problem is a Boolean formula that has three components:

A set of n variables: $x_1, x_2, \ldots, x_n$

A set of literals. A literal is a variable (Q=x) or a negation of a variable (Q=$\bar{x}$).

A set of m distinct clauses: $C_1, C_2, \ldots, C_m$. Each clause consists of only literals combined by just logical OR ∨ connectives.

The goal of the satisfiability problem is to determine whether there is an assignment of truth values that makes the following conjunctive normal form (CNF) formula satisfiable:

$$C_1 \wedge C_2 \wedge \ldots \wedge C_m.$$

where ∧ is the logical AND connective.

See, *Handbook of Applied Optimization*, edited by P. Pardalos and M. Resende, Oxford University Press, 2002, Ch 17.8 Algorithms for the Satisfiability (SAT) Problem, pp. 640-641.

More specifically, given a propositional formula f, a SAT solver finds an assignment to the variables of f that satisfy it, if such an assignment exists, or returns 'unsatisfiable' otherwise. Typically, SAT solvers accept formulas in Conjunctive Normal Form (CNF), i.e., a conjunction of clauses, each contains a disjunction of literals and negated literals. Thus, to satisfy a CNF formula, the assignment must satisfy at least one literal in each clause. Every propositional formula can be translated to this form. See, A. Biere et al. at pp. 138-141.

Figure 4:
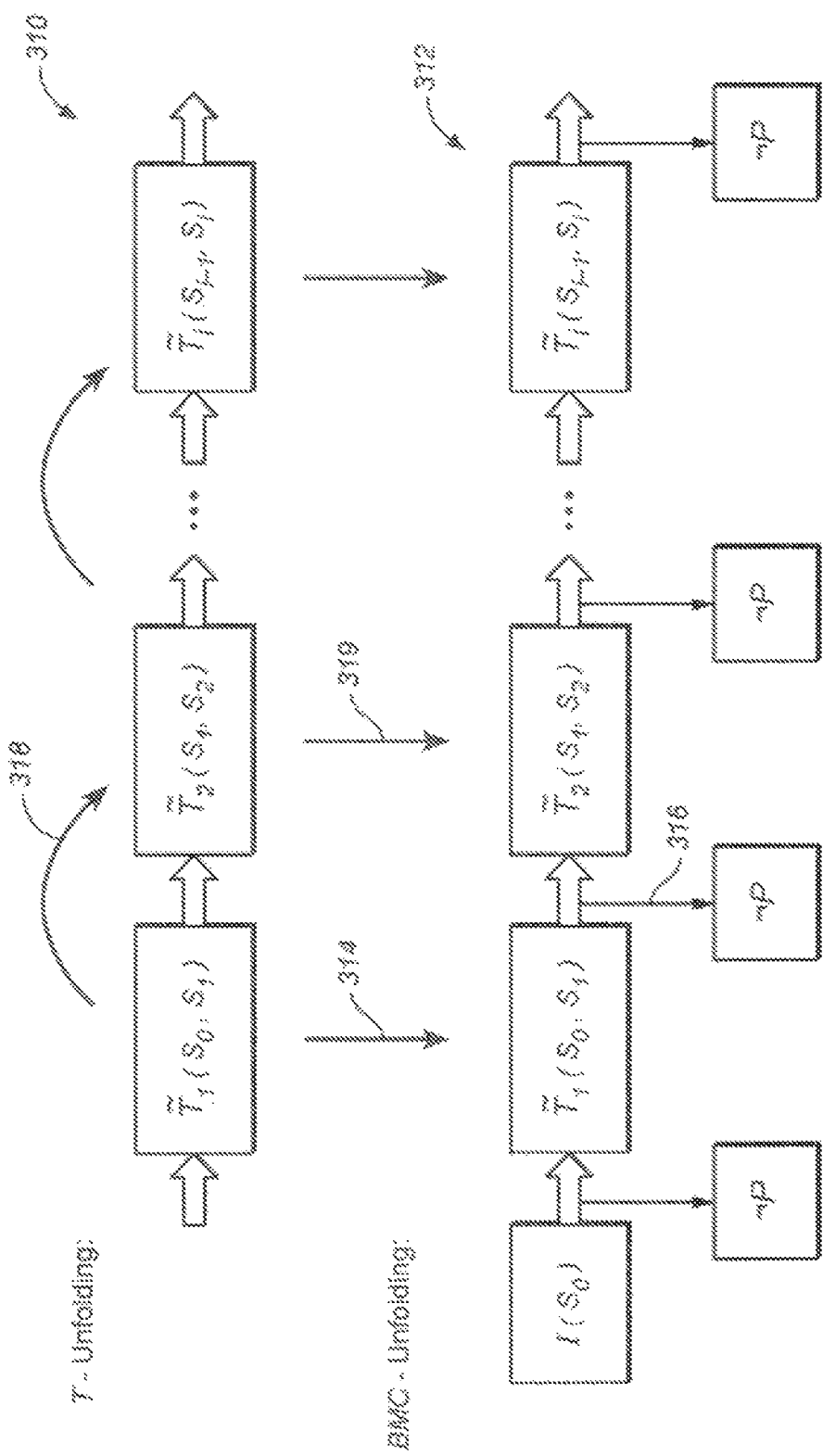
FIG. 4 is an illustrative drawing representing a dual unfolding process for BMC with dynamic transition relation simplification in accordance with an embodiment of the invention.

Dual Unfolding Process for BMC with Dynamic Transition Relation Simplification Basic Approach FIG. 4 is an illustrative drawing representing a dual unfolding process for BMC with dynamic transition relation simplification in accordance with an embodiment of the invention. The T̃-unfolding 310 refers to an uninitialized (i.e. initial state information is not provided) temporal expansion of a transition relation used to progressively simplify the transition relation. The BMC-unfolding 312 illustrates an initialized (i.e. initial state information is provided) temporal expansion of a transition relation used to perform actual SAT checks of a properly. More specifically, each block labeled T̃ represents a FSM in an IC design. The FSM is modeled in a computer readable medium as a transition relation for the purpose of design verification. In general, unfolding a transition relation during a BMC process typically involves a repeated instantiation of the transition relation, and for each instantiation, coupling as previous state value input a next state value output of an the immediate previous instantiation of the transition relation in the unfolding. A BMC-unfolding comprises a temporal sequence of transition relation instantiations represented in computer readable memory, each receiving as its previous state input, the next state output from the immediate prior transition relation instantiation in the sequence.

An embodiment of the invention employs a dual unfolding process to improve simplification of the transition relations of a BMC-unfolding. Basically, $\tilde{T}$-unfolding 310 is used to produce progressively more simplified representations of the transition relation from one frame to the next in the $\tilde{T}$-unfolding 310, and the simplified transition relations representations are substituted into corresponding frames of the BMC unfolding 312. Thus, simplifications of successive frames of the $\tilde{T}$-unfolding 310 are incorporated into successive frames of the BMC-unfolding 312.

More particularly, in the $\tilde{T}$-unfolding 310, $\tilde{T}_i$ denotes the simplified transition relation at time i that is obtained by applying the transition relations from 0 to i−1 for simplification. For example, $\tilde{T}_2(S_1, S_2)$ represents a simplified transition relation at time t=2 that is obtained by applying the transition relations from t=0 to t=1 for simplification. Also, for example, $\tilde{T}_i(S_{i-1}, S_i)$ represents a simplified transition relation at time t=i that is obtained by applying the transition relations from t=0 to t=i−1 for simplification.

In the BMC-unfolding 312, simplified transition relations from the $\tilde{T}$-unfolding 310 are copied to corresponding frames of the BMC-unfolding 312. For example, frame $\tilde{T}_1(S_0, S_1)$ from the $\tilde{T}$-unfolding 310 is copied to corresponding frame $\tilde{T}_1(S_0, S_1)$ of the BMC-unfolding 312. The copied-in frame $\tilde{T}_1(S_0, S_1)$ is used to perform a property check. The frame $\tilde{T}_1(S_0, S_1)$ of the $\tilde{T}$-unfolding 310 is copied to the next frame of the $\tilde{T}$-unfolding 310 and is simplified to produce frame $\tilde{T}_2(S_1, S_2)$ of the $\tilde{T}$-unfolding 310. Frame $\tilde{T}_2(S_1, S_2)$ from the $\tilde{T}$-unfolding 310 is copied to corresponding frame $\tilde{T}_2(S_1, S_2)$ of the BMC-unfolding 312. The copied-in frame $\tilde{T}_2(S_1, S_2)$ is used to perform the property check. In later iterations of this dual unfolding process, a frame $T_{i-1}(S_0, S_1)$ (not shown) of the $\tilde{T}$-unfolding 310 is copied to the next frame of the $\tilde{T}$-unfolding 310 and is simplified to produce frame $\tilde{T}_i(S_{i-1}, S_i)$ of the $\tilde{T}$-unfolding 310. Frame $\tilde{T}_i(S_{i-1}, S_i)$ from the $\tilde{T}$-unfolding 310 is copied to corresponding frame $\tilde{T}_i(S_{i-1}, S_i)$ of the BMC-unfolding 312. The copied-in frame $\tilde{T}_i(S_{i-1}, S_i)$ is used to perform the property check.

This progressive simplification of BMC-unfolding transition relation frames by substituting into the BMC-unfolding 312, progressively more simplified frames from the $\tilde{T}$-unfolding 310 continues as the $\tilde{T}$-unfolding 310 and the BMC-unfolding continue to unfold and add new frames. Although eventually, the $\tilde{T}$-unfolding simplification process saturates, and thereafter, the BMC unfolding 312 may proceed with the last transition relation simplification, without additional substitutions from the $\tilde{T}$-unfolding 310. The improved BMC method applies dynamic simplification of the transition relation using a dual unfolding process. Applying previous time frames as constraints, the transition relation is progressively compacted as the BMC unfolding depth increases. This results in an asymptotic compaction of the transition relation, making the BMC checks of future time frame more efficient.

Algorithm 1 gives the pseudo-code of a BMC algorithm using dynamic simplification. It applies a dual unfolding—$\tilde{T}$ refers to the unfolding that progressively simplifies the transition relation whereas the BMC unfolding performs the actual checks. Intuitively, the simplification of $\tilde{T}_i$ takes advantage of states that are not reachable in i−1 transitions and uses them as don't care. This process is asymptotic and will yield no further reduction once these unreachable states are exhausted. This suggests a practical implementation that unfolds $\tilde{T}$ for a limited number of frames and then continues to use the last $\tilde{T}_i$ for further BMC unfolding.

---

Algorithm 1 BMC USING DYNAMIC SIMPLIFICATION:

1: $\tilde{T}_1(s_0, s_1) := T(s_0, s_1)$ {define simplified first transition relation}
2: $\tilde{T}^1(s_0, s_1) := \tilde{T}(s_0, s_1)$ {define beginning of transition relation path}
3: $BMC_0(s_0, s_0) := 1(s_0)$ {define initial state of BMC unfolding}
4: if SAT ($BMC_0(s_0, s_0) \wedge \neg P(s_0)$) then {SAT check of BMC initial state}
5:   return FAIL
6: for $1 \leq i \leq n$ do {for unfolding from 1 to n instantiations of the transition relation}
7:   $BMC_i(s_0, s_i) := BMC_{i-1}(s_0, s_{i-1}) \wedge \tilde{T}_i(S_{i-1}, S_i)$ {copy $\tilde{T}$ frame to BMC frame}
8:   if SAT ($BMC_i(s_0, s_i) \wedge \neg P(s_i)$) then {SAT check of BMC using copied frame}
9:     return FAIL
10:   $\tilde{T}_{i+1}(s_i, s_{i+1}) := \tilde{T}_i(s_i, s_{i+1})|_{T^i(s_0, s_i)}$ {copy + simplify}
11:   $\tilde{T}^{i+1}(s_0, s_{i+1}) := \tilde{T}^i(s_0, s_i) \text{ E } \tilde{T}_{i+1}(s_i, s_{i+1})$ {build $T^{i+1}$}
12: return SUCCESS

---

Referring to FIG. 4 arrow 314 represents copying frame $\tilde{T}_{i+1}(T_1(S_0, S_1)$ in the example) from the $\tilde{T}$ unfolding 310 to frame $\tilde{T}_{i+1}(T_1(S_0, S_1)$ in the example) of the BMC unfolding 312 (line 7 of Algorithm 1). Arrow 316 represents performance of property check (line 8 of Algorithm 1). Arrow 318 represents copying $\tilde{T}_i$ to the $\tilde{T}_{i+1}$ and simplifying (line 10 of Algorithm 1) to build $\tilde{T}^{i+1}(\tilde{T}_2(S_1, S_2)$ in the example) (line 11 of Algorithm 1). Arrow 318 represents the start of the next cycle by copying $\tilde{T}_{i+1}$ from the $\tilde{T}$ unfolding 310 to $\tilde{T}_{i+2}(T_2(S_1, S_2)$ in the example) of the BMC unfolding 312. It will be appreciated that this illustrated procedure is particularly suited for a circuit-based representation of both unfoldings since it allows an efficient implementation of frame copying and their simplification by structural modifications. As explained below, a present embodiment uses AIGs.

Logical Proof in Support of Transition Relation Simplification

The following paragraphs explain how the transition relation can be simplified as the overall BMC progresses. For this we first introduce the simplify operator, denoted as $A(s)|_{B(s)}$, for two predicates A and B as follows:

$$A(s)|_{B(s)} = \begin{cases} A(s) & \text{if } B(s) = 1 \\ \text{don't care} & \text{otherwise} \end{cases} \quad (7)$$

Don't care means that a simplification procedure can pick any value for A(s). The simplify operator is similar to the classical constrain or restrict operators, see, O. Coudert, C. Berthet, and J. C. Madre, "Verification of sequential machines using Boolean functional vectors," in *IMEC-IFIP International Workshop on Applied Formal Methods for Correct VLSI Design*, pp. 111-128, November 1989; O. Coudert, C. Berthet, and J. C. Madre, "Verification of synchronous sequential machines based on symbolic execution," in International Workshop on Automatic Verification Methods for Finite State Systems, (Grenoble, France), Springer-Verlag, June 1989; H. J. Touati, Savoj, B. Lin, R. K. Brayton, and A. Sangiovanni-Vincentelli, "Implicit state enumeration for finite state machines using BDD's," in *Digest of Technical Papers of the IEEE International Conference on Computer-Aided Design*, pp. 130-133, November 1990; however, it does not require any particular choice for the don't care. In a current embodiment, we will use the don't care to maximally compact a circuit-based representation of the transition functions. Basically, some states are not possible and, therefore, we can simplify the circuit-based representation in view of these not-possible states. As for the constrain and restrict operators, the following property holds also for the simplify operator:

$$A(s)|_{B(s)} \wedge B(s) = A(s) \wedge B(s) \quad (8)$$

We now refer to two new concepts used for the dynamic simplification process. Let $\tilde{T}_i$ denote the simplified transition relation at time i that is obtained by applying the transition relations from 0 to i−1 for simplification. Furthermore, let $\tilde{T}^i$ denote the predicate for the simplified path from 0 to i. $\tilde{T}_i$ and $\tilde{T}^i$ are recursively defined as follows:

$$\tilde{T}_1(s_0, s_1) = T(s_0, s_1)$$

$$\tilde{T}_i(s_{i-1}, s_i) = \tilde{T}_{i-1}(s_{i-1}, s_i)|_{\tilde{T}^{i-1}(s_0, s_{i-1})}$$

$$\tilde{T}^1(s_0, s_1) = \tilde{T}_1(s_0, s_1)$$

$$\tilde{T}^i(s_0, s_i) = \tilde{T}^{i-1}(s_0, s_{i-1}) E \tilde{T}_i(s_{i-1}, s_i) \quad (9)$$

Notice that $\tilde{T}_i$ is simply constructed from $\tilde{T}_{i-1}$ by renaming the variables followed by simplifying it with respect to $\tilde{T}^{i-1}(s_0, s_{i-1})$.

Theorem 1, sets forth key insights into the above simplification process.

Theorem 1

$$\tilde{T}^k(s_0, s_k) = T^k(s_0, s_k)$$

Proof: We show correctness by induction. The base case for k=1 is trivial. For the inductive step we demonstrate the equality for k=i+1 by applying definition (9):

$$\tilde{T}^{i+1}(s_0, s_{i+1}) = T^{i+1}(s_0, s_{i+1})$$

$$\tilde{T}^i(s_0, s_i) \wedge \tilde{T}_{i+1}(s_i, s_{i+1}) = T^i(s_0, s_i) \wedge T(s_i, s_{i+1})$$

$$\tilde{T}^i(s_0, s_i) \wedge \tilde{T}(s_i, s_{i+1})|_{\tilde{T}(s_0, s_i)L} = T^i(s_0, s_i) \wedge T(s_i, s_{i+1})$$

The last equality can be established by using the induction hypothesis for k=i, property (8), and noticing that:

$$\tilde{T}_1(s_i, s_{i+1}) = T(s_i, s_{i+1})|_{T^1(s_{i-2}, s_{i-1})|T^2(s_{i-3}, s_1) \cdots |T^{i-1}(s_0, s_{i-1})}$$

and $$\tilde{T}^j(s_{i-j-1}, s_{i-1}) \supseteq \tilde{T}^i(s_0, s_i) \text{ for } 1 \leq j < i$$

Figure 5:
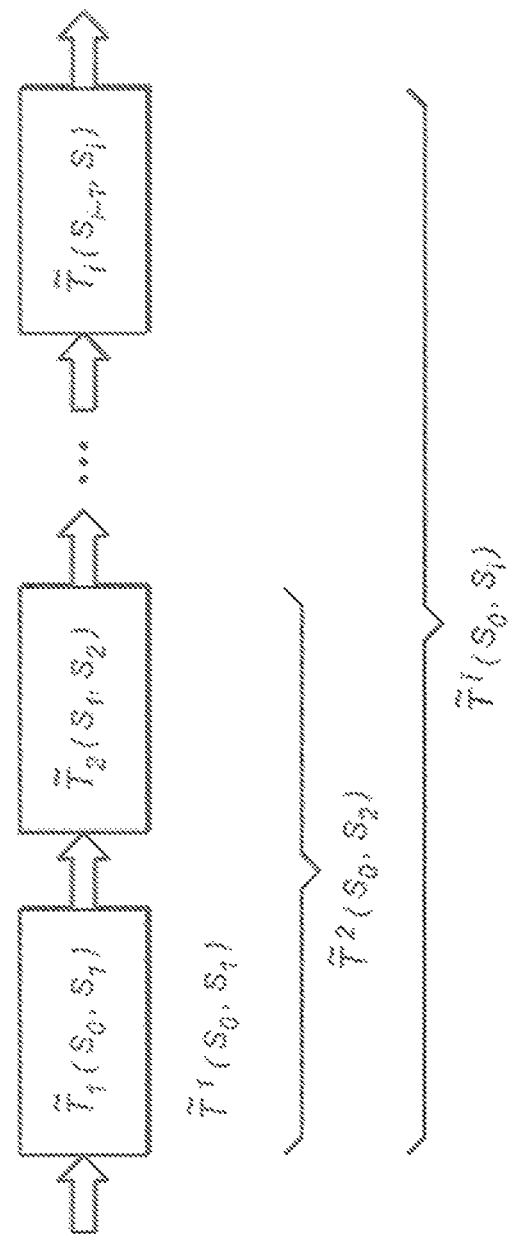
FIG. 5 is an illustrative drawing showing the relationship between a simplified transition relation and simplified path in accordance with an embodiment of the invention.

FIG. 5 is an illustrative drawing showing the relationship between a simplified transition relation $\tilde{T}_i$ and simplified path $\tilde{T}^i$. In accordance with an embodiment of the invention. The recursive definition of (9) corresponds to an iterative construction of the simplified transition relation. During each unfolding step, $\tilde{T}_i$ is copied from $\tilde{T}_{i-1}$ and further simplified with respect to $\tilde{T}^{i-1}$. This establishes an accumulative simplification process for the transition relation that maximally avoids replication of effort.

The following paragraphs explain how we extend the concept of simplified transition relation and simplified paths to also consider properties P that are previously proved for $0 \leq i < k$. For this we modify the definition (9) and introduce the asserted simplified transition relation $\tilde{T}P_i(s_{i-1}, s_i)$ and asserted simplified paths $\tilde{T}P^i(s_0, s_i)$ as follows:

$$\tilde{T}P_1(s_0, s_1) = P(s_0) \wedge T(s_0, s_1)|_{P(s_0)}$$

$$\tilde{T}P_i(s_{i-1}, s_i) = P(s_{i-1}) \wedge \tilde{T}P_{i-1}(s_{i-1}, s_i)|_{\tilde{T}P^{i-1}(s_0, s_{i-1}) \wedge P(s_1)}$$

$$\tilde{T}P^1(s_0, s_1) = \tilde{T}P_1(s_0, s_1)$$

$$\tilde{T}P^i(s_0, s_i) = \tilde{T}P^{i-1}(s_0, s_{i-1}) \wedge \tilde{T}P_i(s_{i-1}, s_i) \quad (10)$$

Theorem 2, which is set forth in the Appendix is a simple extension of Theorem 1 and can be proved in a similar manner.

Theorem 2

$$\tilde{T}P^k(s_0, s_k) = TP^k(s_0, s_k)$$

The modified definition (10) takes advantage of property frames previously proved correct and uses them to increase the don't care set for the simplification. Note that this can have a significant effect on the simplification potential, especially if there are many states violating the property (i.e., the onset of P is small). Furthermore, asserting P is of particular advantage when AIGs are applied for Boolean reasoning—the resulting constant propagation often simplifies the graph structure significantly.

The set of don't care can be further enlarged by simple paths constraints as given in formula (6). The simple paths constraint adds states to the don't care set of $\tilde{T}_i$ which are not reachable in i−1 steps by a simple paths. This approach in effect avoids revisiting a state twice, which could be used to simplify $\tilde{T}$. In practice the simple path constraints are seldom beneficial as they add a large number of constraints to the SAT problem but increase the don't care set only marginally. In our experience this leads to an overall unpredictable performance of the algorithm.

Overview of Basic Boolean Reasoning Using AIG and SAT Sweeping

The following sections describe details of one embodiment of the invention in which a bounded model checking approach uses dynamic simplification of a transition relation. An AND/INVERTER Graph (AIG) has been proposed for equivalence checking in, A. Kuehlmann and F. Krohm, "Equivalence checking using cuts and heaps," in *Proceedings of the 34th ACM/IEEE Design Automation Conference*, (Anaheim, Calif.), pp. 263-268, June 1997, and also for bounded model checking in, A. Kuchlmann, V. Paruthi, F. Krohm, and M. K. Ganai, "Robust Boolean reasoning for equivalence checking and functional property verification," *IEEE Transactions on Computer-Aided Design*, vol. 21, pp. 1377-1394, December 2002; M. K. Ganai and A. Aziz, "Improved SAT-based bounded reachability analysis," in *Proceedings of the 7th ASPDAC/15th International Conference on VLSI Design*, pp. 729-734, January 2002. In one embodiment, AIGs are used to store and manipulate the transition relation and the unfolded BMC formula. The AIG construction permits relatively simple on-the-fly simplifications such as structural hashing and constant folding which are of significant advantage as they can eliminate redundancies during the unfolding process. The actual BMC checks employ SAT queries on the AIG which are implemented by an interleaved application of SAT sweeping to simplify the graph structure and SAT checks for deciding the problem. For more background, see A. Kuehlmann, V. Paruthi, F. Krohm, and M. K. Ganai, "Robust Boolean reasoning for equivalence checking and functional property verification," *IEEE Transactions on Computer-Aided Design*, vol. 21, pp. 1377-1394, December 2002.

Figure 6A:
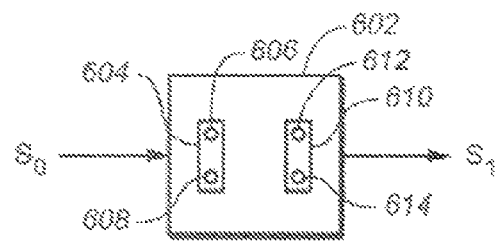
FIGS. 6A-6C are illustrative drawings of an unfolding of a transition relation that represents a finite state machine and that is progressively more simplified from one time frame to the next as unreachable states are determined.
Figure 6B:
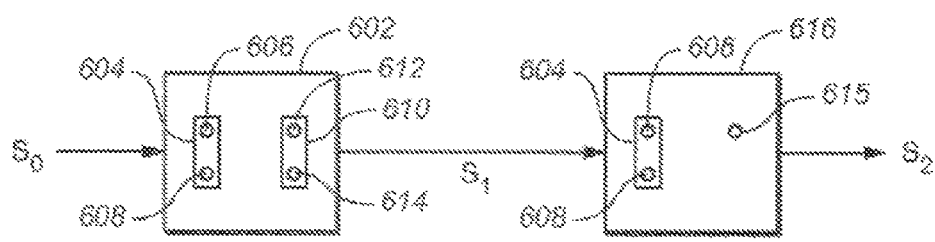
Figure 6C:
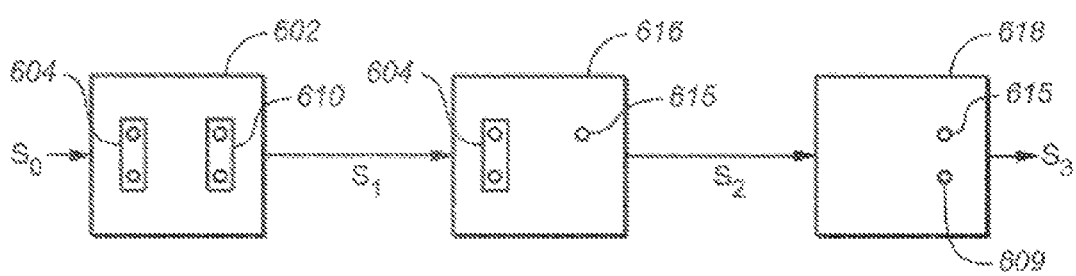

FIGS. 6A-6C are illustrative drawings of an unfolding of a transition relation that is progressively simplified as unreachable states are determined. FIG. 6A is an illustrative drawing showing a first instantiation of a transition relation 602 during a first time frame. In one embodiment, the transition relation 602 represents the combinational logic of a finite state machine as a graph, specifically an AIG. The box 604 within the box 602 identifies a first pair of gates 606, 608 contained in the graph. The box 610 within the box 602 identifies a second pair of gates 612, 614 contained in the graph. The transition relation representation 602 of FIG. 6A receives a combination of states S0 and can produces a combination of states S1. However, it will be appreciated that one or more of the states in S0 may be unreachable after the first time frame, and therefore, may not be included in S1.

Referring to FIG. 6A, in accordance with an embodiment of the invention, a SAT check determines whether the pair of gates indicated by 604 always produce the same results for the same combination of input states S0. If they do always produce the same results for the same combination of input states S0, then this implies existence of a state that is unreachable after the first time frame. If the gates always produce the same results, then a simplification process, will merge gates 604, 608 into one gate, thereby simplifying the transition relation representation. Similarly, a SAT check determines whether the pair of gates indicated by 610 always produce the same results for the same combination of input states S0. If they do always produce the same result for the same combination of input states S0, then this implies existence of a state that is unreachable after the first time frame. If the gates always produce the same results, then a simplification process, will merge gates 612, 614 into one gate, thereby simplifying the transition relation representation.

Refereeing now to FIG. 6B, there is shown first and second time frames of an unfolding represented by a first instantiation of the transition relation 602 during the first time frame and a second instantiation of the transition relation 616 during the second time frame. In this example, the second instantiation 616 includes the first pair of gates 606, 608 but not the second pair 612, 614 that are included in the first instantiation 602. The reason is that for the purposes of this example, it is assumed that there is a state in S0 that is unreachable after the first time frame. Thus, that state is not included in S1. The unreachability of a state is identified by a SAT check process. Specifically, the SAT check determines that the second pair of gates 610 always produce outputs that are the same for all input combinations S0. Consequently, the two gates 612, 614 have become redundant and can be merged into a single gate 609 shown in the second transition relation 616. It will be appreciated that the SAT check process does not explicitly identify which state is unreachable. Rather it implicitly determines that there is an unreachable state since the second pair of gates 612, 614 have become redundant.

Moreover, it is assumed for the purpose of this example that the first set of gates 606, 608 produce different outputs for at least one state input of S0. Thus, these gates 606, 608 are not redundant after the first time frame, and they are included in the second transition relation representation 616.

Referring next to FIG. 6B, there is shown first, second and third time frames of an unfolding represented by first, second and third instantiations of the transition relation 602, 616, 618. In this example, the third instantiation 618 the first pair of gates 606, 608 have been merged into a single gate 609. The reason is that for the purposes of this example, it is assumed that there is a state in S2 that is unreachable after the second time frame. Thus, that state is not included in S2. The unreachability of that state is identified by the SAT check process. Specifically, the SAT check determines that the second pair of gates 604 always produce outputs that are the same for all input combinations S1. Consequently, the two gates 606, 608 have become redundant and can be merged into a single gate 609 shown in the third transition relation 618. Once again, it will be appreciated that the SAT check process does not explicitly identify which state is unreachable. Rather it implicitly determines that there is an unreachable state since the first pair of gates 606, 608 have become redundant.

From FIG. 6A, it will be understood that during the first time frame, combinations of states S0 are provided to the first transition relation instantiation 602, which produces the combination of states S1. From FIG. 6B it will be appreciated that doing a first unfolding of the transition relation, combinations of states S0 are again provided to the first transition relation instantiation 602, which produces the combination of states S1. The combination of states S1 are provided to the simplified second instantiation of the transition relation 616, which produces the combination of states S2. From FIG. 6C it will be appreciated that doing a second unfolding of the transition relation, combinations of states S0 are again provided to the first transition relation instantiation 602, which produces the combination of states S1. The combination of states S1 are again provided to the simplified second instantiation of the transition relation 616, which again produces the combination of states S2. The combination of states S2 are provided to the still further simplified third instantiation of the transition relation 618, which produces the combination of states S3. It also will be understood that this iterative unfolding and simplification process may continue in this fashion until all unreachable states have been determined and no further simplification (e.g. merging of gates) takes place.

AND/INVERTER Graph Representation

Figure 7A:
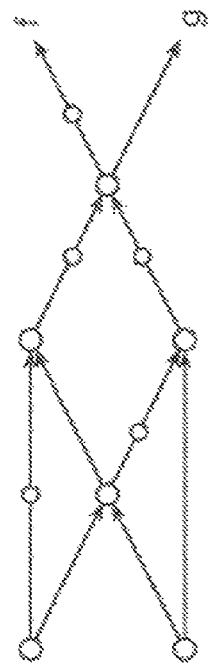
FIGS. 7A-7B are illustrative drawings of a boolean logic circuit and its representation in AIG form.
Figure 7B:
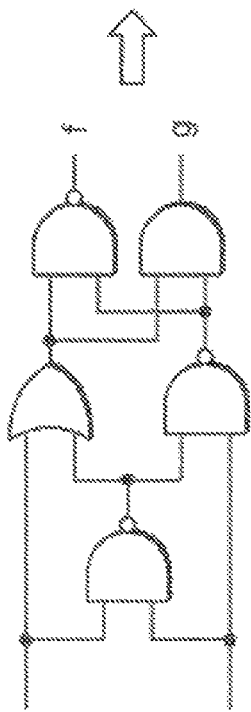

This section gives a short summary of the AIG representation and basic operations to manipulate it. FIGS. 7A-7B are illustrative drawings of a combinational logic circuit and its representation in AIG form. The combinational logic circuit of FIG. 7A is converted to the AIG of FIG. 7B using DeMorgan's law to convert the OR operation. It will be appreciated that the combinational logic circuit of FIG. 7A may represent the combinational logic functions of a transition relation subject to the dual unfolding of an embodiment of the invention. The vertices of the AIG of FIG. 7B represent an AND function. The circles on the edges of the AIG of FIG. 7A represent an INVERT function. Thus, an AIG can represent a transition relation.

More formally, let $C=(V, E)$ denote an AIG, such as that in FIG. 7B, with the set of vertices $V=\{v_0\} \cup X \cup G$ and set of directed edges $E \subset V \times V$. Vertex $v_0$ represents the logical constant 0; X is the set of inputs; and G is the set of AND gates. $v_0$ and all inputs $x \in X$ have no predecessor, whereas the gates $g \in G$ have exactly two incoming edges denoted by $g \rightarrow$right and $g \rightarrow$left. The attribute INVERTED (e) indicates whether the function referenced by edge e is complemented. For referring to functions represented in C, complemented and non-complemented reference pointers point to graph vertices. The semantical interpretation of G is straightforward.

The AIG is built in topological order from the inputs toward the outputs using a set of construction operators and vertex references. An Algorithm, NEW VARIABLE, creates a new variable. A NOT operator simply toggles the INVERTED attribute of a reference. The functions DEREF, TYPE, and INVERTED are used to access the vertex referenced by a pointer, the type TYPE∈{Zero, Input, And} of a vertex, and the complementation attribute of a reference, respectively. The function, LEVEL (v), provides for vertex v the longest paths to any input.

Pseudo-code for the AND operator is shown in Algorithm 2. It takes two vertex reference as input arguments and applies first constant folding (lines 1-6 of Algorithm 2) followed by a hash table lookup (line 9 of Algorithm 2) for identifying simple redundancies. If it is not structurally redundant, a new AND vertex is created and added to the hash table. The meanings of functions RANK, HASH LOOKUP, INSERT HASH, and NEW AND VERTEX are self-explanatory and will be readily understood y persons of ordinary skill in the art without further explanation.

Algorithm 2 AND (l, r):

1:  if $l = \otimes_0$      $\Phi r = \otimes_0$      $\Phi l = \text{NOT}(r)$ then {Constant folding}
2:     return $v_0$
3:  if $l = \text{NOT}(v_0)$ then
4:     return r
5:  if $r = \text{NOT}(v_0) \vee l = r$ then
6:     return l
7:  if RANK (l) > RANK (l) then {Sort to catch commutativity}
8:     temp := r; r := l; l := temp
9:  v := HASHLOOKUP (l, r)
10: if v = ⊥ then {Hash miss}
11:    v := NEWANDVERTEX
12:    v → left := l
13:    v → right := r
14:    INSERTHASH(l, r, v)
15: return v An important transformation on an AIG is the MERGE operator. In a present embodiment, the MERGE operator is used to declare two vertices as functional equivalent (e.g. as a result of a SAT check) and to perform corresponding changes in the graph. The implementation of MERGE moves outgoing edges from one vertex to the other and rehashes the fanout structure towards the outputs until all changes are propagated.

SAT Sweeping

A SAT sweeping process in accordance with a present embodiment of the invention identifies structurally identical vertices and merges them using a MERGE operator through an interleaved application of a word-parallel simulator and a CNF-based SAT solver. For additional background see, E. Goldberg and Y. Novikov, "BerkMin: A fast and robust SAT-solver," in *Design Automation and Test in Europe*, (Paris, France), pp. 142-149, March 2002. Although a circuit-based SAT solver could be employed instead of one that is CNF-based. In general, it is known that Boolean reasoning can be performed efficiently on an AIG by interleaved applications of graph simplification from the inputs and SAT checks from the output. For more background see, A. Kuehlmann, V. Paruthi, F. Krohm, and M. K. Ganai. "Robust Boolean reasoning for equivalence checking and functional property verification," *IEEE Transactions on Computer-Aided Design*, vol. 21, pp. 1377-1394, December 2002.

In one embodiment, the SAT sweeping process iteratively selects a pair of vertices from the AIG representing the T̂-unfolding 310 that are to be tested for equivalence. As explained elsewhere herein, each vertex represents an AND gate in the AIG, the SAT sweeping process chooses pairs of vertices for comparison that have higher likelihood of being found to be structurally equivalent during an AIG SAT check described below. In one embodiment, vertex pair selection involves running a simulation on the AIG representing the T̂-unfolding 310. A simulation signal input pattern is applied to the primary inputs of the transition relations of the T̂-unfolding and to the state inputs to the first transition relation of the T̂-unfolding. As a result of the simulation, for each of a plurality of vertices of the AIG, a vector is produced comprising a sequence of signal values generated for that vertex during the simulation process. These vectors are compared, and vertices with matching vectors are eligible for selection for the AIG SAT check process.

For each selected vertex pair, a pattern of input values is applied to the inputs of the transition relations of the T̂-unfolding and to the state inputs to the first transition relation of the T̂-unfolding. In one embodiment, the pattern of input values comprises a random pattern. More specifically, a sequence of patterns of input values is provided to the primary inputs of the transition relations of the T̂-unfolding and to the state inputs of the first transition relation of the T̂-unfolding. A Boolean function is produced for each vertex of the selected pair based upon the AIG. More particularly, a pair of Boolean functions are produced to represent the AND/INVERTER logic fan-ins to the selected vertices. In one embodiment, the Boolean function is in CNF. The Boolean function for each selected vertex is used to compute a value for its vertex corresponding to each input value pattern. The Boolean formulas thereby compute values for their corresponding vertices based upon the applied input value patterns. The sequence of values computed for the two vertices are compared. If the sequence of values matches, then the selected vertices are determined to be structurally identical, and they are merged in the AIG. If the sequence of values does not match, then the selected vertices are determined to be not structurally identical, and they are not merged in the AIG.

This vertex pair selection and AIG SAT check process continues for a next pair of vertices. The vertex pair selection and AIG SAT check process ends when all vertices have been merged or determined to be not equivalent or some other prescribed processing limit is reached. In this manner, successive transition relation frames of the T̂-unfolding 310 is progressively simplified. Each progressively simplified transition relation frame of T̂-unfolding 30 is substituted into a corresponding frame of the BMC-unfolding 312.

Figure 8A:
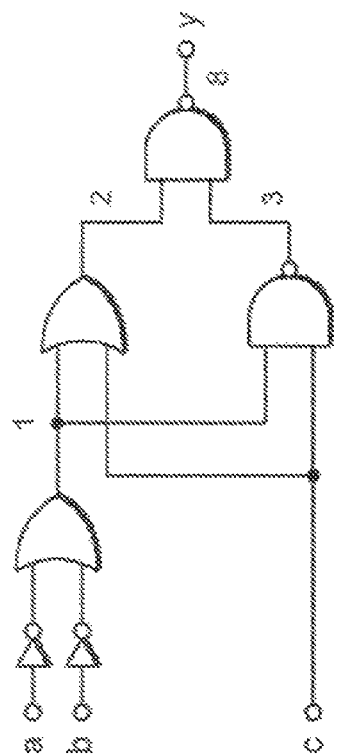
FIGS. 8A-8B are illustrative drawings of two circuits that are structurally different but functionally equivalent.
Figure 8B:
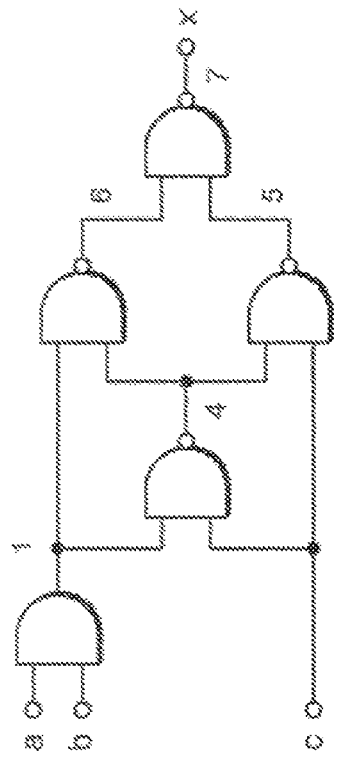
Figure 9B:
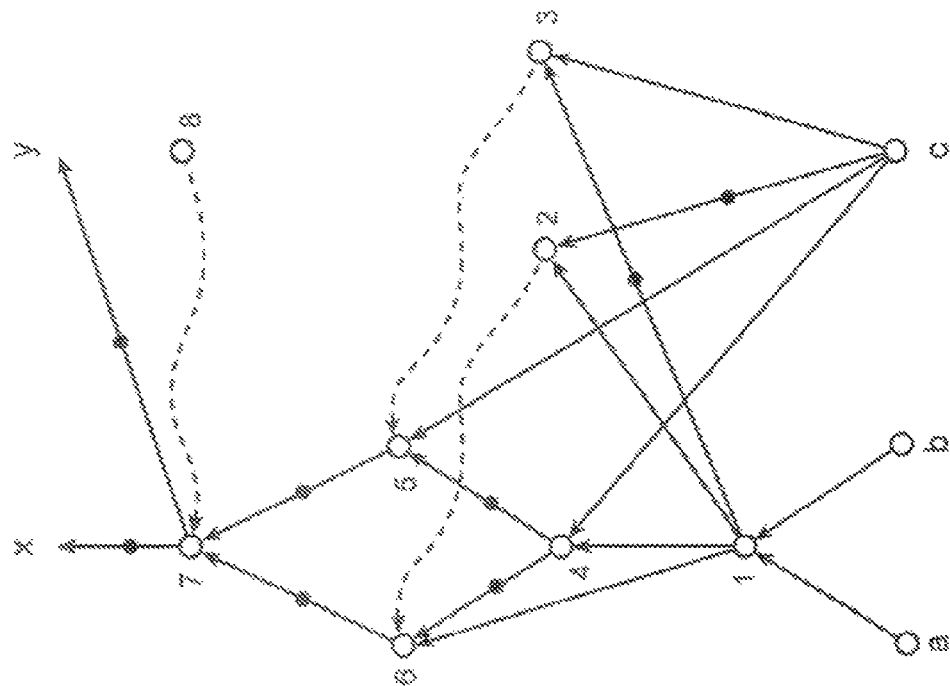
FIGS. 9A-9B are illustrative drawings of an AIG for the two circuits of FIGS. 8A-8B before and after simplification using a SAT sweeping process in accordance with an embodiment of the invention.
Figure 9A:
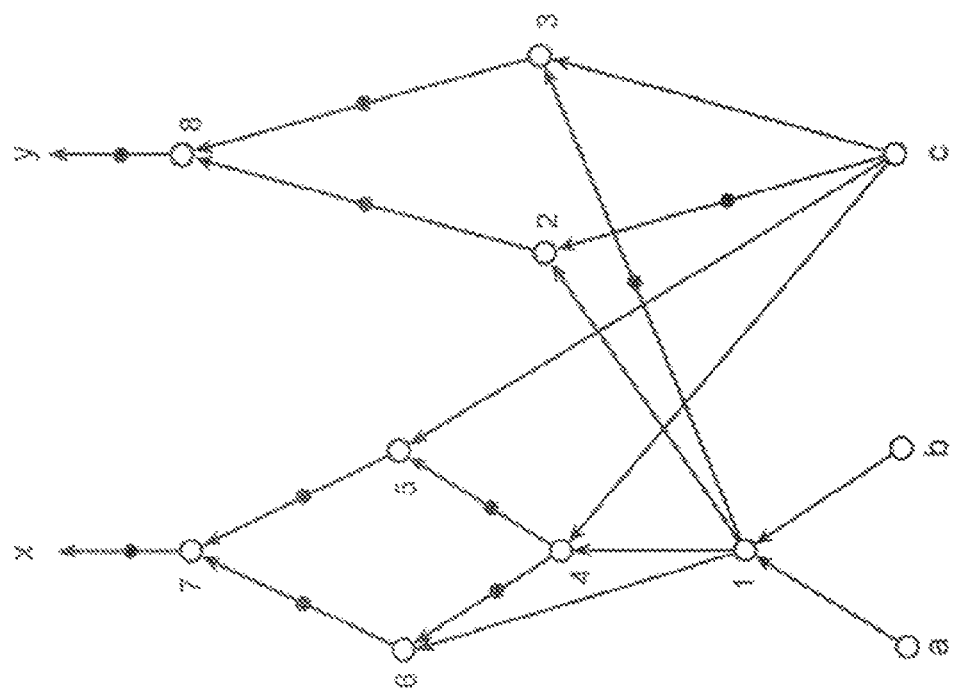

FIGS. 8A-8B are illustrative drawings of two circuits that are structurally different but functionally equivalent. FIGS. 9A-9B are illustrative drawings of an AIG for the two circuits of FIGS. 8A-8B before and after simplification using a SAT sweeping process in accordance with an embodiment of the invention. The vertices of the graphs in FIGS. 9A-9B represent AND functions. The filled dots at the edges symbolize the INVERTERS. In producing the AIG, OR gates are converted to AND gates in accordance with De Morgan's law. Also note that the function A AND B of the first circuit shown in FIG. 8A and the A-Bar OR B-Bar of the second circuit shown in FIG. 8B are identified as structurally equivalent (modulo inversion) and are mapped to the same vertex 1 in FIG. 8A. FIG. 9A shows the AIG prior to simplification. FIG. 9B shows the AIG following simplification. The dashed lines in FIG. 9B indicate that 2 and 6 have been merged; vertices 3 and 5 have been merged; and vertices 7 and 8 have been merged.

Algorithm 3 outlines the basic flow of SAT sweeping in accordance with one embodiment of the invention. The goal of the process illustrated through this algorithm is to identify all pairs of functionally equivalent vertices and merge them in the AIG. In essence, some states may not be reachable after some number of time frames. Therefore it is permissible to merge vertices in the graph pertaining to these unreachable states. For this a simulation signal input pattern (set of simulation vector) is applied for refining the vertex equivalence classes $\{V_1, V_2, \ldots, V_c\}$. (lines 1-2 of Algorithm 3) During each iteration of the algorithm a SAT solver is applied for cluster $V_i$ to check equivalence of two of its vertices (line 13 of Algorithm 3). If the SAT check returns "unsatisfiable," equivalence is shown. Both vertices are then merged and replaced in $V_i$ by only one representative (line 17, 18). Note that the MERGE operation rehashes the fan-out structure in the graph, which can cause a "chain reaction" of identifying more equivalences which do not need to be proved by additional SAT queries. The merging of nodes, for example, may result in two nodes now having identical inputs when in the past, they did not have identical inputs; rehashing compacts the AIG by causing these two nodes to be represented by a single node in the AIG.

| Algorithm 3 SAT SWEEPING: |
| --- |
| 1: {Given : Circuit graph C = (V, E) with inputs X} |
| 2: randomly initialize simulation vectors for all x ∈ X |
| 3: Clusters := {V}  {Initially all vertices in single cluster} |
| 4: while (1) do |
| 5:  simulate C to update all vertex signatures sig(v) {Apply simulation input pattern} |
| 6:  ∀v ∈ V : phase(v) = first bit of simulation vector {Choice of the first bit is arbitrary} |
|     refine partitioning {$V_1, V_2, \ldots V_c$} s.t. |
| 7:       {Signature and complement} |
|     ∀u, v ∈ $V_i$ : sig(u) ⊕ phase(u) = sig(v) ⊕ phase(v) |
| 8: if ∀i : |$V_i$| = 1 ∨   (UsedResource > ResourceLimit) then |
| 9:  return |
| 10: else |
| 11:  for all i : |$V_i$| > 1 do {Once per cluster} |
|        select u, v ∈ $V_l$ s.t. |
| 12:       {Select the most shallow vertices} |
|     (u, v) = argmin max (LEVEL(u) and LEVEL(v)) |
| 13:  res := SAT_CHECK ((u ⊕ phase(u)) ⊕ (v ⊕ phase(v))) |
| 14:  if res = SAT then |
|        extend simulation vector for all x ∈ X by |
| 15: |
|        SAT counter - example |
| 16:  else if res = UNSAT then {u and v equivalent} |
| 17:    MERGE (u ⊕ phase(u), v ⊕ phase(v)) |
| 18:    remove v from $V_i$ {u is representative for v in $V_i$} |

By way of further explanation, a pair of vertices that have identical signatures, whether under complementation or not, are selected (line 7 of Algorithm 3). Two vertices may be functionally equivalent if they have signatures that are identical without complementation or that are identical with complementation. If two vertices are identical without complement, then their phase bits are identical. If two vertices are identical with complement, then their phase bits are complements of each other. The application of the XOR operation between each vertex signature and its phase ensures that the signature comparison process checks for the possibility of vertex equivalence with and without complementation.

A pair of vertices determined to have identical signatures may or may not be functionally equivalent. The AIG SAT solver (line 13 of Algorithm 3) is used to test for functional equivalence of selected vertex pairs. The AIG SAT check uses the XOR operation between each vertex and its phase to evaluate whether a pair of vertices is identical with and without complement.

If the AIG SAT check returns "satisfiable" then the counterexample leading to that result, expressed in terms of the inputs, is appended to a simulation signal input pattern used to produce signature vectors for vertices in the AIG (line 15 of Algorithm 3). During a subsequent refinement iteration of the vertex selection process in which a new simulation signal input pattern is produced, one or more appended counterexamples, which typically provide "interesting" corner cases, may increase the likelihood of breaking apart more vertex clusters (line 7 of Algorithm 3). This appending of counterexamples to the simulation signal input pattern used during the selection of vertices enhances the likelihood of identifying vertices that are not likely to be equivalent and of sorting those non-equivalent vertices into different clusters. In other words, the vertex clusters are further broken apart. This use of counterexamples combined with the use of vertex merging and rehashing borrowed from BDD sweeping, see, A. Kuchlmann and F. Krohm, "Equivalence checking using cuts and heaps," in *Proceedings of the 34th ACM/IEEE Design Automation Conference*, (Anaheim, Calif.). pp. 263-268, June 1997, therefore, provides additional advantages.

In a present embodiment, AIG SAT checks (line 13 of Algorithm 3) are scheduled so as to postpone SAT checks involving vertices that are deeper in the graph until after SAT checks have been performed on shallower vertices, since SAT checks on deeper vertices are more time consuming and may not even finish Therefore, during each iteration the two most "shallow" vertices are selected from each cluster $V_i$ (line 12 of Algorithm 3). A refinement of this strategy handles only the subset of the $V_i$ in each iteration which is closest to the primary inputs. This refinement takes advantage of the forward rehashing during MERGE as it often covers SAT checks that are outstanding for vertices deeper in the graph. The shown pseudo-code does not include the resource control for the SAT check (line 13 of Algorithm 3). For efficiency, one would start with little effort (e.g. controlled by the number of decisions in the SAT query) and increase it over time.

The process described by the Algorithm 3 terminates when each cluster contains only one representative vertex. This means that all vertices of the simplified AIG are functionally unique. Furthermore, the set of simulation vectors includes for each pair of vertices at least one vector that distinguishes them. A second, alternative termination condition checks for exceeding a ResourceLimit and thus provides a mean for the calling program to control the effort spent in SAT sweeping.

SAT Check for AIG Vertices

In the course of BMC unfolding process, SAT sweeping is interleaved with a direct SAT check for the property to be proved. Algorithm 4 shows a simplified flow adapted from, A. Kuchlmann, V. Paruthi, F. Krohm, and M. K. Ganai, "Robust Boolean reasoning for equivalence checking and functional property verification," *IEEE Transactions on Computer-Aided Design*, vol. 21, pp. 1377-1394, December 2002.

| Algorithm 4 SAT (v): |
| --- |
| 1:  while (1) do |
| 2:    if v = NOT ($v_0$)then {NOT($v_0$) represents constant value 1} |
| 3:      return SAT |
| 4:    if v = $v_0$ then {$v_0$ represents constant value 0} |
| 5:      return UNSAT |
| 6:    res:= SAT_CHECK (v) {Attempt to check vertex directly} |
| 7:    if res = SAT then |
| 8:      return SAT |
| 9:    else if res = UNSAT then |
| 10:     return UNSAT |
| 11:   SAT SWEEPING (ResourceLimit) {Simplify graph} { ALGORITHM 3} |
| 12:   increase ResourceLimit |

Steps 1-5 of Algorithm 4 represent a constant propagation process in which vertices are checked directly. If $v_0$ is constant value 1, then the result is SAT. If $v_0$ is constant value 0, then the result is UNSAT. Steps 6-11 of Algorithm 4 interleave SAT cheek (lines 6-10) with SAT sweeping (line 11). For each unfolding, the BMC-unfolding 312 is iteratively SAT checked and its AIG is compacted through SAT sweeping. This BMC SAT sweeping process (represented by line 11 of Algorithm 4) results in simplification of the BMC-unfolding 312 in addition to simplification achieved through substitution of simplified frames of the T-unfolding 310.

Thus, SAT sweeping is employed within the T̃-unfolding 310 as well as the BMC-unfolding 312. The T̃-unfolding 310 is not initialized, whereas the BMC-unfolding 312 is initialized, which ensures that the SAT sweeping work done for T̃ is maximally reused for all BMC frames. Also one skilled in the art will appreciate that primary inputs are applied during the simulation stages of SAT sweeping for both the T̃-unfolding and the BMC-unfolding, although primary inputs are not shown in the illustrative drawings.

Dual Unfolding Process for BMC with Dynamic Transition Relation Simplification

Detailed Description

This section describes the application of the AIG reasoning presented in the previous section for bounded model checking and an implementation of dynamically simplifying a transition relation in this framework using SAT sweeping in accordance with one embodiment of the invention.

A vectored compose operation is used to achieve unfolding of transition relations represented as AIGs during bounded model checking in a present embodiment of the invention. Basically, a series of transition relation instances are instantiated in during such unfolding. The vectored compose operation is used to achieve such repeated instantiation.

In essence, T̃-unfolding 310 is produced using a vectored compose operator that, in essence, attaches a piece of the T̃-unfolding AIG at an output of another piece of the T̃-unfolding AIG. Let s denote a sorted vector of vertex references of the AIG and s[i] refer to its ith component. Algorithm 5 gives the pseudo-code for the vectored compose operator. VECTOR COMPOSE builds a new function vector $s_{res}$ from $s_j$ by replacing all occurrences of $s_h$ by $s_g$. The parameters $l_{gh}$ and $l_f$ represent the length of vectors $s_g/s_h$ and $s_f$, respectively.

The VECTOR COMPOSE routine is used to substitute some inputs $s_h$ of an AIG by finding an $s_g$, also given by the AIG. For this, as shown in the pseudo-code, the algorithm VECTOR COMPOSE first resets a set of shadow variables for each vertex v∈V and then initializes the vertices of $s_h$ with the corresponding entries of $s_g$. It then uses a function COPY, illustrated in pseudo-code in Algorithm 6, to recursively build the composed vectors $s_{res}$ from $s_f$. The recursive COPY routine is used to attach the current AIG to a copy of the current AIG. The vectored application of compose advantageously minimizes redundant graph traversals and vertex replications. Furthermore, the embedded application of the AND operation performs constant folding and simple restructuring on the fly.

---

Algorithm 5 VECTOR COMPOSE ($s_g$, $s_h$, $l_{gh}$, $s_f$, $l_f$)

1:     for all v ∈ V do
2:         shadow(v) := ⊥ {marker indicating that nothing has yet happened}
3:     for 1 ≤ j ≤ $l_{gh}$ do
4:         shadow($s_h$ [j]) := $s_g$ [j] {initialize values for shadow(v)}
5:     for 1 ≤ j ≤ $l_f$ do
6:         $s_{res}$ [i] := COPY ($s_f$[j]) {recursive COPY routine}
7:     return $s_{res}$

---

Algorithm 6 COPY (e)

1:     v = DEREF(e)
2:     if shadow(v) ≠ ⊥ then
3:         if TYPE(v) = Input then
4:             shadow(v) := NEWVARIABLE
5:         else
6:             shadow(v) := AND (COPY (v → left),
                      COPY (v → right)) {Algo. 2, builds vertex}
7:     if INVERTED(e) then
8:         return NOT (shadow(v)) {complement the edge}
9:     else
10:    return (shadow(v))

---

The following is an explanation of a basic BMC algorithm using an AIG representation. As applied in the section, Preliminary Discussion of BMC in General, let s and s' denote the vectors of AIG references for the set of current and next state variables of the transition relation T(s, s'), respectively, and m=|s|=|s'| be the number of state bits.

Algorithm 7 outlines the basic BMC flow using an AIG. First, the graph representation of T is constructed by initializing the set s with fresh variables and building the components of vector s' in topological order from s towards s' (lines 1 and 2). P and I denote the references of the property to be verified and initial state predicate, respectively. The AIG representations for them are built in a similar manner (lines 3-5 of Algorithm 7). For the bounded unfolding of T the variable $s_i$ denotes the vector of references of the copy of state variables for time frame i and $P_i$ for the copy of the property at that fame.

The BMC unfolding is performed by successively composing the current state variables of T with the tailing set of unfolded state variables $s_i$ (line 8 of Algorithm 7). Similarly, the copy $P_i$ of the property is built by composing the variables s in P with the tailing state variables $s_i$ (line 9 of Algorithm 7). It is then checked for satisfiability (line 10 of Algorithm 7). As noted before the use of an AIG provides an efficient implementation for attaching new time frames as it heavily utilizes structural hashing and constant folding.

---

Algorithm 7 BASIC BMC

1:     s := NEWVARIABLES { current state vars of T}
2:     s' := BUILDT(s)
3:     P := BUILDP (s)
4:     $s_0$ := NEWVARIABLES { current state vars of BMC frame 1}
5:     I := BUILDP($s_0$)
6:     MERGE (I, NOT ($v_0$)) { Assert initial state attribute }
7:     for 0 ≤ i ≤ n do
8:         $s_{i+1}$ := VECTORCOMPOSE ($s_i$,s,m,s',m)
9:         $P_i$ := VECTORCOMPOSE($s_i$,s,m,P,1)
10:        if SAT(¬ $P_i$) = SAT then
11:           return FAIL
12:    return SUCCESS

---

Having describing the infrastructure used to implement BMC using dual T̃-unfolding and BMC-unfolding, the follow section presents additional details of the dynamic simplification scheme in accordance with one embodiment of the invention. Algorithm 8 sets forth these details in pseudo-code. For clarity details for using proved properties to further increase the don't care set for simplification have been omitted. However, the changes to the implementation to include such simplification are straightforward and can easily be derived by a person of ordinary skill in the art from definition (10).

Figure 10:
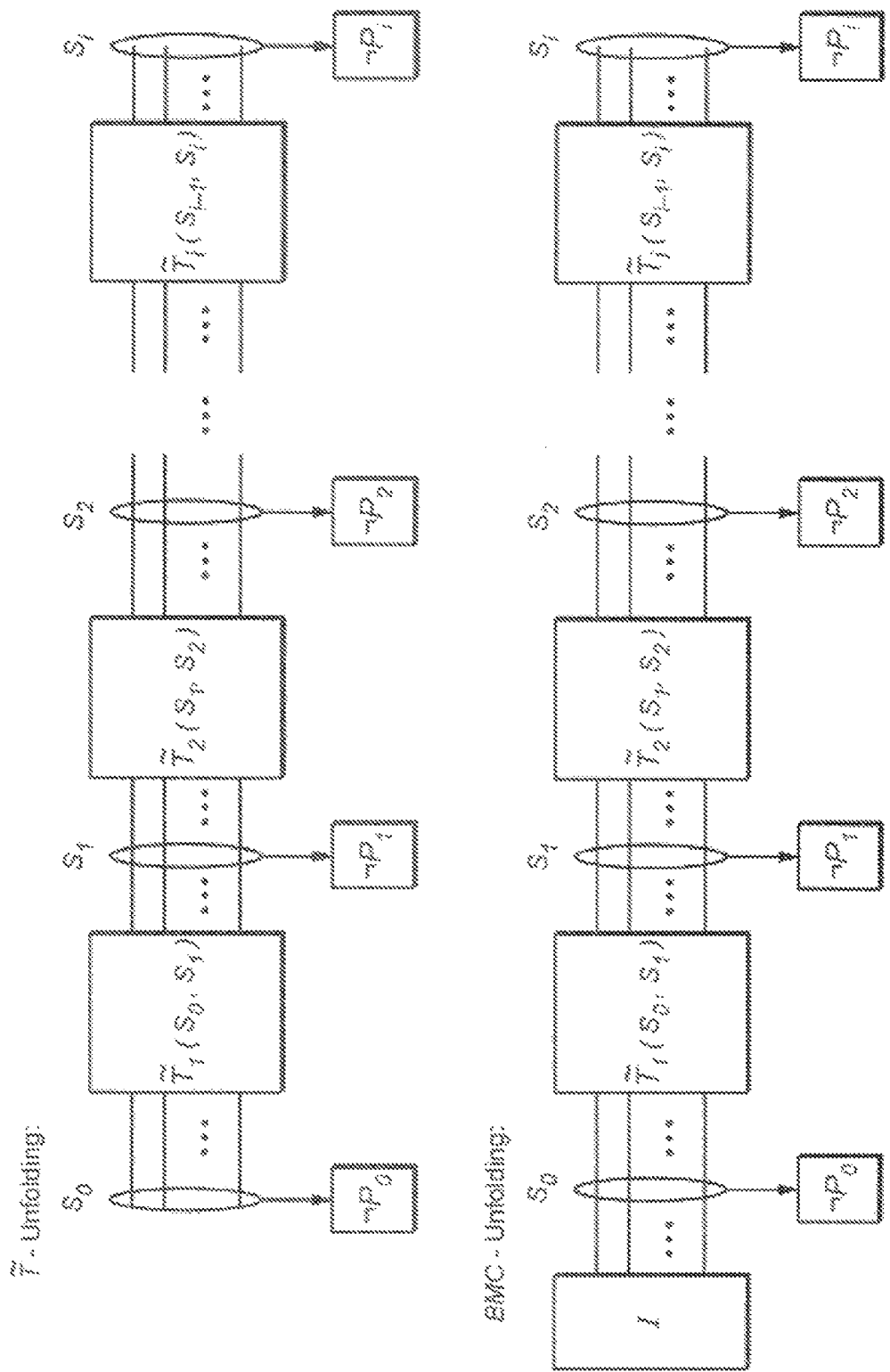
FIG. 10 is an illustrative drawing of a dual $\tilde{T}$-unfolding and BMC-unfolding using AIG in accordance with an embodiment of the invention.

FIG. 10 is an illustrative drawing of a dual T̃-unfolding and BMC-unfolding using AIG in accordance with an embodiment of the invention. The dual unfolding process is summarized in the pseudo-code of Algorithm 8. There are two sets of state variable vectors. State variable vectors $\tilde{s}^i$ denote the variables used for the $\tilde{T}$ unfolding whereas state variable vectors $s_i$ denote the variables used for the BMC unfolding. Similarly, the notation $\tilde{P}_i$ and $P_i$ denote the property in the $\tilde{T}$ and BMC unfoldings, respectively. In the pseudo-code, the operator "||" denotes vector concatenation.

T-unfolding 310 unfolds. Suppose that during SAT sweeping, the node that originated in T, as copied into $T_i$ is merged (backward) with a node in $T_{i-1}$. That backward merging of a node that originated in the original frame T signifies that the node will preserve its value for future time frames. In other words, if the copied node is constant from $T_{i-1}$ to $T_i$, then it will be identical throughout. It will be appreciated that the $\tilde{T}$-unfolding 310 does not determine an actual constant value

---

Algorithm 8 BMC USING DYNAMIC SIMPLIFICATION

```
 1:   s̃₀ := NEWVARIABLES { current state vars of T̃₁ }
 2:   s̃₁ := BUILDT(s̃₀) {build a first frame T₁ of the T-unfolding}
 3:   P̃₀ := BUILDP(s̃₀) {build a first frame P₀ of the proposition logic}
 4:   SAT SWEEPING {Simplify T̃₁ and P̃₀}
 5:   s₀ := NEWVARIABLES {current state vars of BMC frame 1} {initialize BMC}
 6:   I := BUILDI(s₀) {apply initial states}
 7:   MERGE (I, NOT (v₀)) { asssert initial state attribute }
 8:   s₁ := VECTORCOMPOSE (s₀,s̃₀,m,s̃₁,m)
 9:   P₀ := VECTORCOMPOSE(s₀,s̃₀,m, P̃₀,1)
10:   if SAT (¬ P₀) = SAT then {does initial state hold?}
11:       return FAIL {check BMC first frame}
12:   for 1 ≦ i ≦ n do {Loop}
13:       s̃ᵢ₊₁ := VECTORCOMPOSE
             ((s̃ᵢ||...||s̃ᵢ), ((s̃₀||...||s̃ᵢ₋₁), i · m,s̃ᵢ,m) {attach new T̃ -unfolding frame}
14:       P̃ᵢ := VECTORCOMPOSE
             ((s̃ᵢ||...||s̃ᵢ), ((s̃₀||...||s̃ᵢ₋₁), i · m, P̃ᵢ₋₁,m) {attach new P frame}
15:       SAT SWEEPING {Simplify T̃ᵢ₊₁ and P̃ᵢ}
16:       Pi:= VECTORCOMPOSE
             ((s₀||...||sᵢ), ((s̃₀||...||s̃ᵢ), (i + 1) · m,s̃ᵢ₊₁,m) {add new simplified T frame to BMC}
17:       sᵢ₊₁ := VECTORCOMPOSE {add new simplified P frame to BMC}
             ((sᵢ||...||s₀), ((s̃₀||...||s̃ᵢ),(i + 1) · m,s̃ᵢ₊₁,m)
18:       if SAT (¬ P₁) = SAT then {property check; Algorithm 4}
19:           return FAIL {if not FAIL then do loop again}
20:   return SUCCESS
```

---

The overall flow of the dual unfolding process is similar to the basic version in Algorithm 7, BASIC BMC. First, the initial frames and property for the $\tilde{T}$ (lines 1-4 of Algorithm 8) and BMC unfoldings (lines 5, 8, and 9 of Algorithm 8) are constructed and the predicate for the initial state is built and asserted (lines 6 and 7 of Algorithm 8). After checking the property at the initial states (line 10 of Algorithm 8), the main loop is executed for a given number of iterations. It repeatedly composes a new copy $\tilde{T}_{i+1}(\tilde{s}_i,\tilde{s}_{i+1})$ from $\tilde{T}_i(\tilde{s}_{i-1},\tilde{s}_i)$ (line 13 of Algorithm 8) and simplifies it using SAT sweeping (line 15 of Algorithm 8). Similarly, a new copy of $\tilde{P}_i$ is built and simplified (lines 14 and 15 of Algorithm 8). Next the $\tilde{P}_i$ and $\tilde{T}_{i+1}$ are attached to the BMC unfolding (lines 16 and 17 of Algorithm 8) and $\tilde{P}_i$ is checked for satisfiability (line 18 of Algorithm 8).

The interleaving of time frames during the composition of $\tilde{s}$ and s (lines 13, 14, 16, 17 of Algorithm 8) ensures that vertices of different time frames in the $\tilde{T}$ unfolding become merged.

The SAT sweeping step in Algorithm 8 is applied on the entire $\tilde{T}$ unfolding. Whenever two AIG vertices of two different time frames that originated from the same vertex in T (the original transition relation) get merged an equivalence of the form $\tilde{v}_{1-i} \leftrightarrow \tilde{v}_i$ is detected. This corresponds to an inductive invariant and can immediately be exploited for simplifying $\tilde{T}$ by merging the vertex $\tilde{v}_{1-i}$ in $\tilde{T}$ with the corresponding vertex $\tilde{v}_{1-i}$ in the BMC unfolding (which is either constant or some function of primary inputs only). Note that even if $\tilde{v}$ is not the property, the merging step is beneficial for the simplification of $\tilde{T}$. However, if the merging of $\tilde{v}$ results in a constant 1 for the property $\tilde{P}_i$ its correctness is proved inductively, and the BMC process can be terminated.

More specifically, for example, if a node (vertex) is in the original $\tilde{T}$ frame, then the node is copied forward as the T-unfolding 310 unfolds. Suppose that during SAT sweeping, the node that originated in T, as copied into $T_i$ is merged (backward) with a node in $T_{i-1}$. That backward merging of a node that originated in the original frame T signifies that the node will preserve its value for future time frames. In other words, if the copied node is constant from $T_{i-1}$ to $T_i$, then it will be identical throughout. It will be appreciated that the $\tilde{T}$-unfolding 310 does not determine an actual constant value of the node. It just determines that whatever that value might be, it will remain the same. Now, suppose also that the BMC-unfolding 312. through SAT sweeping of the BMC unfolding 312, determines an actual value for the node identified as constant in the $\tilde{T}$-unfolding 310. Then that actual value can be copied from the BMC-unfolding 310 to the $\tilde{T}$-unfolding 310 to further simplify the $\tilde{T}$-unfolding 310.

In this following section, results that are provided support the overall BMC implementation employing an AIG representation, SAT sweeping, dynamic transition relation simplification, and simplification through induction. The embodiment of FIG. 10 was imprinted using a state-of-the-art SAT solver comparable to E. Goldberg and Y. Novikov, "BerkMin: A Fast and robust SAT-solver," in *Design Automation and Test in Europe*, (Paris, France), pp. 142-149, March 2002, for SAT_CHECK in the SAT sweeping algorithm given in Algorithm 3 and the global check outlined in Algorithm 4.

Figure 11:
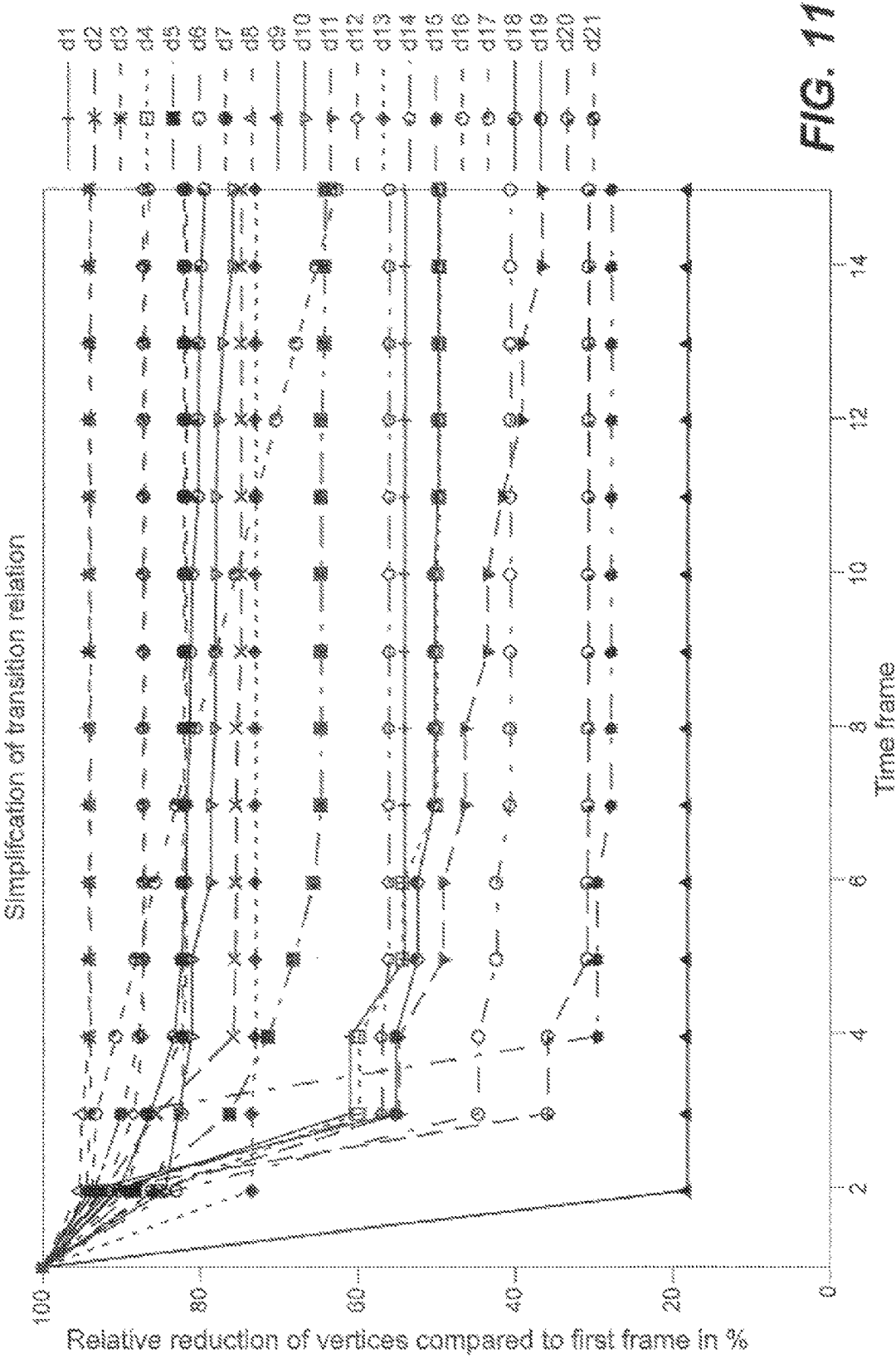
FIG. 11 illustrates simplification of the transition relation for industrial benchmarks used in FIG. 12; at each time frame the size of the transition relation in terms of AND vertices is compared with the size of the first time frame $\tilde{T}_1$.

For gaining insight into the actual reduction power of the dynamic simplification scheme, we used a set of industrial property checking problems. These problems were produced straight from the language frontend and included a large amount of redundancy. In order to establish a meaningful comparison point, the problems were first compacted problems using SAT sweeping. The transition relation was then simplified using the $\tilde{T}$ unrolling mechanism during the actual BMC run. FIG. 11 shows how the transition relation $\tilde{T}_i$ gets reduced with increasing unfolding depth. The plot demonstrates a significant reduction potential of the dynamic simplification scheme. After only a few unfolding steps, the transition relation can be reduced to an afterage of 62% of the size of the simplified transition relation of the first time frame. Such substantial decrease of the AIG size greatly helps the SAT search during the BMC checks and often results in an exponential reduction of its runtime. This outcome is encouraging and fully justifies the use of dynamic transition relation simplification especially for longer BMC unfoldings where the accumulative gain is significant.

The additional effort for the transition relation simplification is not always offset by the gain during the BMC checks. Especially for shorter BMC sequences, the overhead can easily eliminate any performance gain. This observation led to a tuned implementation of the simplification scheme that controls the depth and effort of the transition relation simplification based on the depth of the BMC run, the size of the AIG, and the measured simplification complexity.

The dual unfolding implementation was compared with a state-of-the-art BMC implementation that is based on a plain CNF translation of the unfolded formulas, see A. Biere, A. Cimatti, E. M. Clarke and Y. Zhu, "Symbolic model checking without BDDs," in 5*th International Conference on Tools and Algorithms for Construction and Analysis of Systems* (*TACAS* '99) (Amsterdam, Netherlands) pp. 193-207, March 1999. Both implementations utilize the same core SAT solver (E. Goldberg and Y. Novikov), which makes them to some degree comparable. Table 1 shown in FIG. 12 provides an overview of the results on the set of industrial property benchmarks. The table lists the number of state variable and the lengths of the shortest counter-example in columns 2 and 3. The fourth column reports the runtime for the CNF-based reasoning scheme and Column 5 gives the runtime for the presented methods based on a tuned combination of the methods presented in this paper.

Simplified Finite State Machine

Figure 13:
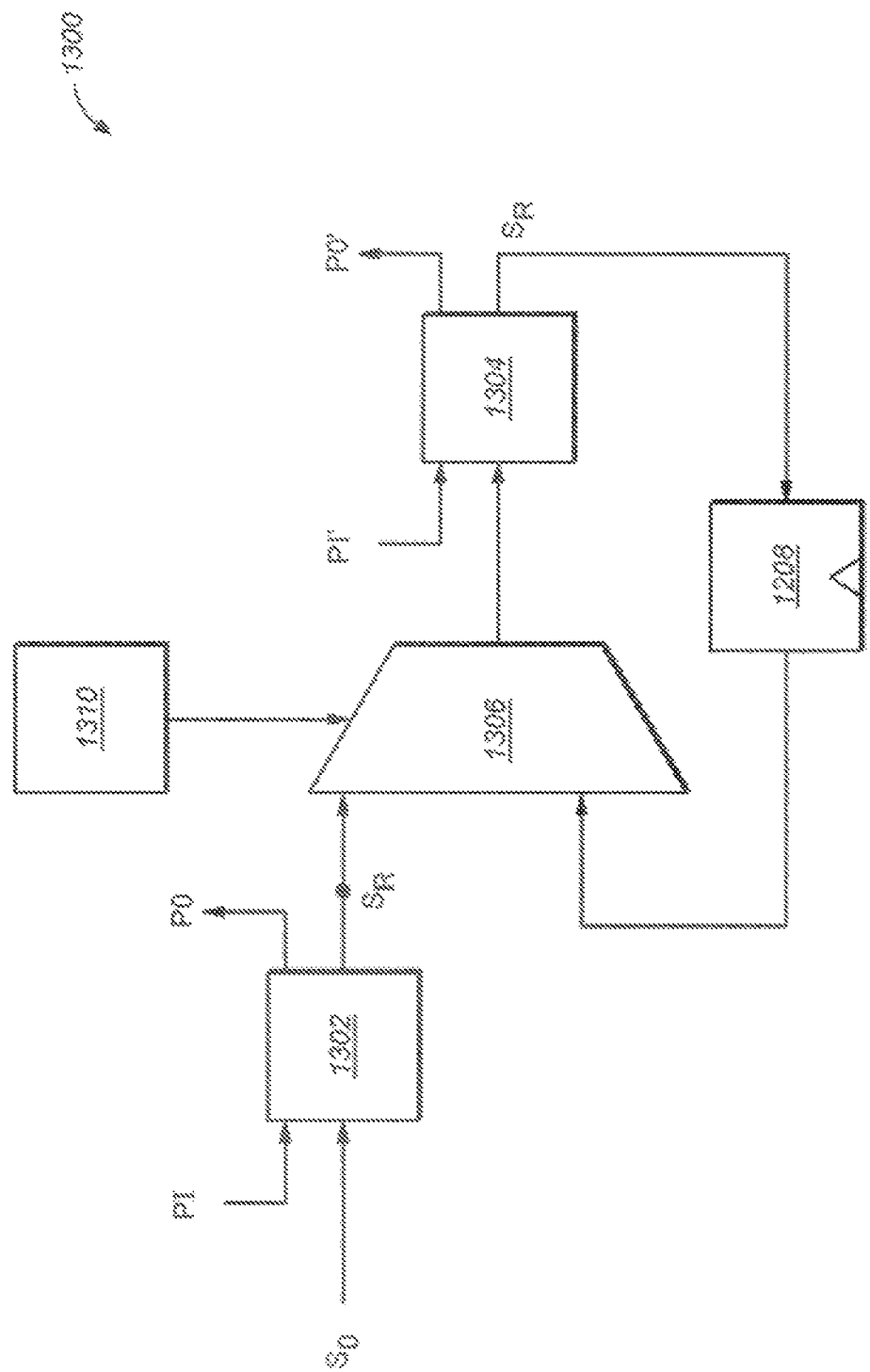
FIG. 13 is an illustrative block diagram of a finite state machine in accordance with an embodiment of the invention.

FIG. 13 is an illustrative drawing of a finite state machine 1300 in accordance with an embodiment of the invention. The finite state machine, which may be implemented as an integrated circuit for example, includes initialization circuitry 1302 and recurrent circuitry 1304. The initialization circuitry 1302 receives as input initial states S0 and primary inputs (P1) and provides as output primary outputs (PO) and reachable states $S_R$. The recurrent circuitry 1304 receives as its input the reachable states $S_R$ and primary inputs (P1'). The recurrent circuitry 1304 provides as its output the reachable states $S_R$. Multiplex circuitry 1306 selects either output reachable states $S_R$ from the initialization circuitry 1302 or reachable states $S_R$ fed back by the recurrent circuitry 1304 for input to the recurrent circuitry 1304. Register circuitry 1308 is coupled to temporarily buffer state output fed back by the recurrent circuitry 1304 before passing it to a state input of the recurrent circuitry 1304 via the multiplex circuitry 1306. Control circuitry 1310 controls selection by the multiplexer 1306 between reachable state input provided by the initialization circuitry or reachable state input fed back by the recurrent circuitry 1304.

The initialization circuitry 1302 is operative to compute states that are reachable during initial time frames of operation of the state machine 1300. The recurrent circuitry 1304 is operative to compute states that are reachable after the initial time frames of operation of the state machine 1300. The control circuitry 1310 instructs the multiplexer 1306 to couple either state output of the initialization circuitry 1302 or buffered state output of the recurrent circuitry 1304 to a state input of the recurrent circuitry, depending upon whether or not the finite state machine is operating in its initial time frames.

In one embodiment, the initialization circuitry 1302 comprises an unsimplified version of a finite state machine such as the state machine of FIG. 1. The recurrent circuitry 1304 comprises a version of such a state machine that has been simplified in accordance with a simplification process, such as SAT sweeping, as described herein. The control circuitry 1310 causes the multiplexer 1306 to provide a reachable state initialization input to a state input of the recurrent circuitry 1304 after some prescribed number of time frames. For example, it may have been determined through the SAT sweeping process, for example, that the last of the unreachable states will become unreachable after the eighth time frame. In that case, for example, the control circuitry 1310 can be implemented to cause the multiplexer 1306 to provide the $S_R$ state output to the recurrent circuitry 1304 at the eighth time frame, and to cause the multiplexer 1306 to provide feedback $S_R$ state output from a state output the recurrent circuitry to a state input of the recurrent circuitry 1304 after the eighth time frame. During the initial time frames, primary inputs and primary outputs are routed to and from the initialization circuitry 1302, and after the initial time frames, primary inputs and primary outputs are routed to and from the recurrent circuitry 1304.

In another embodiment, for example, the initialization circuitry may comprise a series of progressively simplified versions of the finite state machine, such as versions that have been progressively simplified as explained with reference to FIGS. 6A-6C. In other words, the initialization circuitry 1302 may include multiple instantiations of an original finite state machine, such as the machine of FIG. 1, with each instantiation being simplified relative to its preceding instantiation, through SAT sweeping, for example. The operation of the control circuitry 1310 and the multiplex circuitry 1306 in this alternative embodiment is basically as described above for the first embodiment.

One advantage of the finite state machine 1300 of FIG. 13 is that the simplified logic used to process reachable states may be significantly less complex, and therefore, faster, than the less simplified logic used during initial frames before unreachable states become unreachable. Thus, during initial start-up of the finite state machine 1300, the less simplified version of the finite state machine of the initialization circuitry 1302 is used, and after the first few time frames, when the unreachable states have become unreachable, the machine 1300 switches over to the simpler recurrent circuitry 1304. As a result, the machine 1300 actually may operate with greater speed after the initial time frames.

In another embodiment (not shown) of the invention, a finite state machine that includes initialization circuitry and recurrent circuitry like that of FIG. 13 implemented in a time sharing fashion in reprogrammable fabric, such as a Programmable Logic Device (PLD). A Filed Programmable Gate Array (FPGA) is an example of on type of PLD. For instance, during a first time interval, during initial time frames, the initialization circuitry is encoded in the reprogrammable fabric. During a second time interval, when the initial time frames have passed, the recurrent circuitry is encoded in the reprogrammable fabric. Thus, as above, during initial start-up of the finite state machine a less simplified version of the finite state machine, represented by initialization circuitry, is used, and after the first the initial time frames, when the unreachable states have become unreachable, a simpler version of the machine, represented by the recurrent circuitry is used. As a result, the machine may operate with greater speed and become more compact after the initial time frames. Control circuitry may be encoded in the switching fabric to control the switching from initialization circuitry to recurrent circuitry.

Computer Code Implementation of Finite State Machine

It will be appreciated that computer readable code representing functionality of initialization circuitry and computer readable code representing functionality of recurrent circuitry may be stored in computer readable storage medium that is accessed to encode into the reprogrammable fabric. The code can program the reprogrammable fabric to perform the function of the initialization circuitry and can program the reprogrammable fabric to perform the function of the recurrent circuitry. The code can be developed through a SAT sweeping process such as that described above.

Improved Simulation with Simplified Finite State Machine

In another embodiment (not shown), initialization circuitry and the recurrent circuitry like that of FIG. 13 may be instantiated in a computer readable form for use as a simulation model during a simulation process. The initialization circuitry is used as a simulation model during initial frames before unreachable states become unreachable. The recurrent circuitry is used as a simulation model after initial frames, when unreachable states have become unreachable. An advantage of this approach is that simulation actually may speed up significantly after the initial time frames when the simpler recurrent circuitry representation is invoked.

While the invention has been described herein with reference to various illustrative features, aspects and embodiments, it will be appreciated that the invention is susceptible of variations, modifications and other embodiments, other than those specifically shown and described. For example, Espresso logic minimizer can be used for logic simplification. The invention is therefore to be broadly interpreted and construed as including all such alternative variations, modifications and other embodiments within its spirit and scope as hereinafter claimed.

The invention claimed is:

1. A method of simulating behavior of a finite state machine comprising:
    using a computer to simulate behavior of a finite state machine, using as a simulation model, a sequence of one or more transition relations that represent combinational logic behavior of the finite state machine during an initial set of time frames; and
    after the initial set of time frames, using as a simulation model, a version of a transition relation that is simplified with respect to at least one state that is unreachable after the initial set of time frames.

2. The method of claim 1,
    wherein the sequence of transition relations include a sequence of progressively more simplified versions of the transition relation with respect to unreachable states.

3. The method of claim 1,
    wherein the sequence of transition relations include a sequence of instantiations of an unsimplified transition relation.

4. A non-transitory computer readable medium encoded with computer readable code for use in performing a method of claim 1.

5. The method of claim 1,
    wherein the simplified version of the transition relation includes logic that has been simplified to remove redundancy that arises after the initial set of time frames.

6. The method of claim 1,
    wherein the simplified version of the transition relation includes logic that has become redundant, in that it cannot reach a state after the initial time fame that it could reach during an initial time frame, has been simplified.

7. A system to simulate behavior of a finite state machine comprising:
    a sequence of one or more transition relations that comprise combinational logic of the finite state machine during an initial set of time frames; and
    a version of a transition relation that comprises combinational logic that is simplified with respect to at least one state that is unreachable after the initial set of time frames.

8. The system of claim 7,
    wherein the sequence of transition relations include a sequence of progressively more simplified versions of the transition relation with respect to unreachable states.

9. The system of claim 7,
    wherein the sequence of transition relations include a sequence of instantiations of an unsimplified transition relation.

10. The system of claim 7,
    wherein the simplified combinational logic includes a version of the combinational logic of the finite state machine during an initial set of time frames in which logic has been simplified to remove redundancy that arises after the initial set of time frames.

11. The system of claim 7,
    wherein the simplified combinational logic includes a version of the combinational logic of the finite state machine during an initial set of time frames in which logic that has become redundant, in that it cannot reach a state after the initial time frame that it could reach during the initial time frame, has been simplified.

12. An article of manufacture that includes non-transitory memory media encoded with code to cause a computer to perform a process to simulate behavior of a finite state machine comprising:
    using as a simulation model, a sequence of one or more transition relations that represent combinational logic behavior of the finite state machine during an initial set of time frames; and
    after the initial set of time frames, using as a simulation model, a version of the transition relation that is simplified with respect to at least one state that is unreachable after the initial set of time frames.

13. The article of claim 12,
    wherein the sequence of transition relations include a sequence of progressively more simplified versions of the transition relation with respect to unreachable states.

14. The article of claim 12,
    wherein the sequence of transition relations include a sequence of instantiations of an unsimplified transition relation.

15. The article of claim 12,
    wherein the simplified version of the transition relation includes logic that has been simplified to remove redundancy that arises after the initial set of time frames.

16. The article of claim 12,
    wherein the simplified includes a version of the transition relation includes logic that has become redundant, in that it cannot reach a state after the initial time frame that it could reach during the initial time frame, has been simplified.

* * * * *